United States Patent
Bar-Or Tillinger et al.

(10) Patent No.: US 12,513,543 B2
(45) Date of Patent: Dec. 30, 2025

(54) PRIMARY CELL BEAM-BASED SECONDARY CELL BEAM INDICATION

(71) Applicant: QUALCOMM Incorporated, San Diego, CA (US)

(72) Inventors: Amit Bar-Or Tillinger, Tel-Aviv (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 17/933,955

(22) Filed: Sep. 21, 2022

(65) Prior Publication Data

US 2024/0098530 A1    Mar. 21, 2024

(51) Int. Cl.
*H04W 24/08* (2009.01)
*H04W 76/10* (2018.01)

(52) U.S. Cl.
CPC ........... *H04W 24/08* (2013.01); *H04W 76/10* (2018.02)

(58) Field of Classification Search
CPC ...... H04W 24/08; H04W 76/10; H04B 7/088; H04B 7/0695
See application file for complete search history.

(56) References Cited

U.S. PATENT DOCUMENTS

| | | | | |
|---|---|---|---|---|
| 2006/0264184 A1* | 11/2006 | Li | ............... | H04B 17/382 455/562.1 |
| 2008/0170533 A1* | 7/2008 | Cyzs | ............... | H04B 5/48 370/315 |
| 2016/0174088 A1* | 6/2016 | Yilmaz | ............ | H04W 36/0088 455/434 |
| 2017/0054479 A1* | 2/2017 | Sang | ................ | C07D 413/12 |
| 2017/0208494 A1* | 7/2017 | Moon | ............... | H04B 7/06958 |
| 2017/0223744 A1* | 8/2017 | Qian | ................ | H04W 74/0833 |
| 2019/0044602 A1* | 2/2019 | Cui | ................ | H04B 7/08 |
| 2019/0238287 A1* | 8/2019 | Zhou | ............... | H04W 52/143 |
| 2019/0326971 A1* | 10/2019 | Tang | ................ | H04B 7/0696 |
| 2020/0068576 A1* | 2/2020 | Li | ................ | H04W 72/541 |
| 2020/0120602 A1* | 4/2020 | Geng | ............... | H04W 72/044 |
| 2021/0105051 A1* | 4/2021 | Min | ................ | H04B 5/43 |
| 2021/0329546 A1 | 10/2021 | Wang et al. | | |
| 2022/0070853 A1 | 3/2022 | Guo | | |
| 2022/0131669 A1 | 4/2022 | Takeda et al. | | |
| 2024/0040416 A1* | 2/2024 | Hosseini | ............ | H04W 24/10 |

OTHER PUBLICATIONS

International Search Report and Written Opinion—PCT/US2023/072019—ISA/EPO—Dec. 13, 2023.

* cited by examiner

*Primary Examiner* — Kevin T Bates
*Assistant Examiner* — Hector Reyes
(74) *Attorney, Agent, or Firm* — Harrity & Harrity LLP

(57) ABSTRACT

Various aspects of the present disclosure generally relate to wireless communication. In some aspects, a user equipment (UE) may communicate, with a primary cell, one or more signals using a first beam that is associated with a first spatial direction. The UE may measure a subset of beams from a set of beams associated with a secondary cell, wherein the subset of beams is selected based at least in part on the first beam or the first spatial direction. The UE may establish a connection with the secondary cell using a second beam from the subset of beams based at least in part on the measurements of the subset of beams. Numerous other aspects are described.

20 Claims, 14 Drawing Sheets

PRIMARY CELL BEAM-BASED SECONDARY CELL BEAM INDICATION

FIELD OF THE DISCLOSURE

Aspects of the present disclosure generally relate to wireless communication and to techniques and apparatuses for primary cell (PCell) beam-based secondary cell (SCell) beam indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
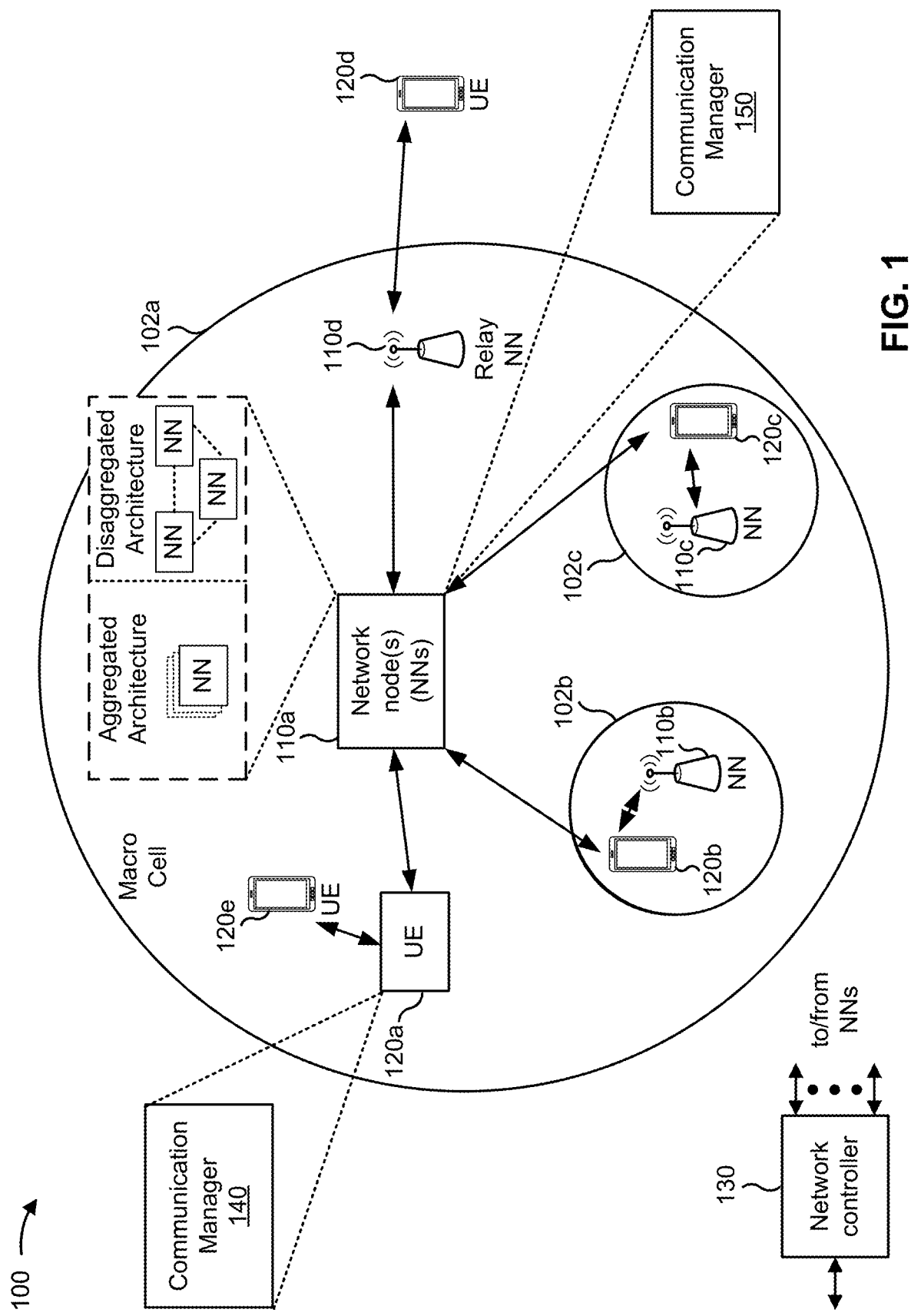
FIG. 1 is a diagram illustrating an example of a wireless network, in accordance with the present disclosure.

Some aspects described herein relate to a user equipment (UE) for wireless communication. The UE may include a memory and one or more processors coupled to the memory. The one or more processors may be configured to communicate, with a primary cell, one or more signals using a first beam that is associated with a first spatial direction. The one or more processors may be configured to measure a subset of beams from a set of beams associated with a secondary cell, wherein the subset of beams is selected based at least in part on the first beam or the first spatial direction. The one or more processors may be configured to establish a connection with the secondary cell using a second beam from the subset of beams based at least in part on the measurements of the subset of beams.

Some aspects described herein relate to a network node for wireless communication. The network node may include a memory and one or more processors coupled to the memory. The one or more processors may be configured to communicate, via a primary cell associated with the network node, one or more signals associated with a UE using a first beam that is associated with a first spatial direction. The one or more processors may be configured to transmit, via the primary cell, an indication of one or more parameters for a beam measurement procedure that is associated with the UE and a secondary cell, wherein the one or more parameters are based at least in part on the first beam or the first spatial direction.

Some aspects described herein relate to a method of wireless communication performed by a UE. The method may include communicating, with a primary cell, one or more signals using a first beam that is associated with a first spatial direction. The method may include measuring a subset of beams from a set of beams associated with a secondary cell, wherein the subset of beams is selected based at least in part on the first beam or the first spatial direction. The method may include establishing a connection with the secondary cell using a second beam from the subset of beams based at least in part on the measurements of the subset of beams.

Some aspects described herein relate to a method of wireless communication performed by a network node. The method may include communicating, via a primary cell associated with the network node, one or more signals associated with a UE using a first beam that is associated with a first spatial direction. The method may include transmitting, via the primary cell, an indication of one or more parameters for a beam measurement procedure that is associated with the UE and a secondary cell, wherein the one or more parameters are based at least in part on the first beam or the first spatial direction.

Some aspects described herein relate to a non-transitory computer-readable medium that stores a set of instructions for wireless communication by a UE. The set of instructions, when executed by one or more processors of the UE, may cause the UE to communicate, with a primary cell, one or more signals using a first beam that is associated with a first spatial direction. The set of instructions, when executed by one or more processors of the UE, may cause the UE to measure a subset of beams from a set of beams associated with a secondary cell, wherein the subset of beams is selected based at least in part on the first beam or the first spatial direction. The set of instructions, when executed by one or more processors of the UE, may cause the UE to establish a connection with the secondary cell using a second beam from the subset of beams based at least in part on the measurements of the subset of beams.

Some aspects described herein relate to a non-transitory computer-readable medium that stores a set of instructions for wireless communication by a network node. The set of instructions, when executed by one or more processors of the network node, may cause the network node to communicate, via a primary cell associated with the network node, one or more signals associated with a UE using a first beam that is associated with a first spatial direction. The set of instructions, when executed by one or more processors of the network node, may cause the network node to transmit, via the primary cell, an indication of one or more parameters for a beam measurement procedure that is associated with the UE and a secondary cell, wherein the one or more parameters are based at least in part on the first beam or the first spatial direction.

Some aspects described herein relate to an apparatus for wireless communication. The apparatus may include means for communicating, with a primary cell, one or more signals using a first beam that is associated with a first spatial direction. The apparatus may include means for measuring a subset of beams from a set of beams associated with a secondary cell, wherein the subset of beams is selected based at least in part on the first beam or the first spatial direction. The apparatus may include means for establishing a connection with the secondary cell using a second beam from the subset of beams based at least in part on the measurements of the subset of beams.

Some aspects described herein relate to an apparatus for wireless communication. The apparatus may include means for communicating, via a primary cell associated with the apparatus, one or more signals associated with a UE using a first beam that is associated with a first spatial direction. The apparatus may include means for transmitting, via the primary cell, an indication of one or more parameters for a beam measurement procedure that is associated with the UE and a secondary cell, wherein the one or more parameters are based at least in part on the first beam or the first spatial direction.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. In some examples, the higher frequency bands may include a sub-terahertz (sub-THz) frequency band. The sub-THz frequency band may include frequencies include in the FR4a, FR4-1, FR4, FR5, or higher frequencies. For example, the sub-THz frequency band may include frequencies greater than 100 GHz. In some cases, the sub-THz frequency band may include frequencies in the range of 90 GHz-300 GHz.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges. Similarly, the term "sub-THz" may broadly represent frequencies greater than 90 GHz, frequencies less than 1 THz (and greater than 90 GHz), or frequencies in the range of 90 GHz-300 GHz.

In some aspects, the UE 120 may include a communication manager 140. As described in more detail elsewhere herein, the communication manager 140 may communicate, with a primary cell, one or more signals using a first beam that is associated with a first spatial direction; measure a subset of beams from a set of beams associated with a secondary cell, wherein the subset of beams is selected based at least in part on the first beam or the first spatial direction; and establish a connection with the secondary cell using a second beam from the subset of beams based at least in part on the measurements of the subset of beams. Additionally, or alternatively, the communication manager 140 may perform one or more other operations described herein.

In some aspects, the network node 110 may include a communication manager 150. As described in more detail elsewhere herein, the communication manager 150 may communicate, via a primary cell associated with the network node, one or more signals associated with a UE using a first beam that is associated with a first spatial direction; and transmit, via the primary cell, an indication of one or more parameters for a beam management procedure that is associated with the UE and a secondary cell, wherein the one or more parameters are based at least in part on the first beam or the first spatial direction. Additionally, or alternatively, the communication manager 150 may perform one or more other operations described herein.

As indicated above, FIG. 1 is provided as an example. Other examples may differ from what is described with regard to FIG. 1.

Figure 2:
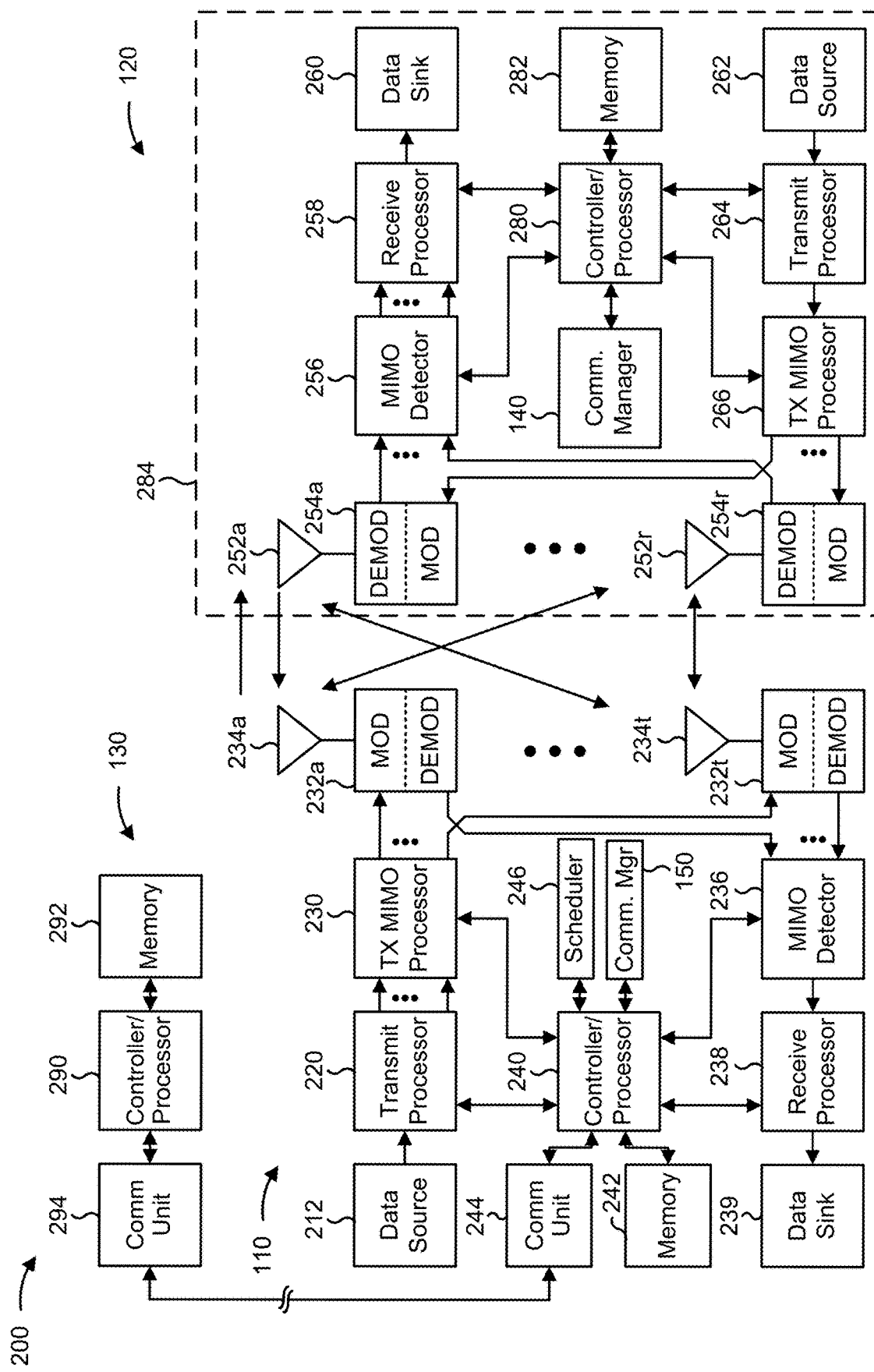
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the network node 110, the controller/processor 280 of the UE 120, and/or any other component(s) of FIG. 2 may perform one or more techniques associated with primary cell (PCell) beam-based secondary cell (SCell) beam indications, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for communicating, with a primary cell, one or more signals using a first beam that is associated with a first spatial direction; means for measuring a subset of beams from a set of beams associated with a secondary cell, wherein the subset of beams is selected based at least in part on the first beam or the first spatial direction; and/or means for establishing a connection with the secondary cell using a second beam from the subset of beams based at least in part on the measurements of the subset of beams. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for communicating, via a primary cell associated with the network node, one or more signals associated with a UE using a first beam that is associated with a first spatial direction; and/or means for transmitting, via the primary cell, an indication of one or more parameters for a beam management procedure that is associated with the UE and a secondary cell, wherein the one or more parameters are based at least in part on the first beam or the first spatial direction. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be collocated with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
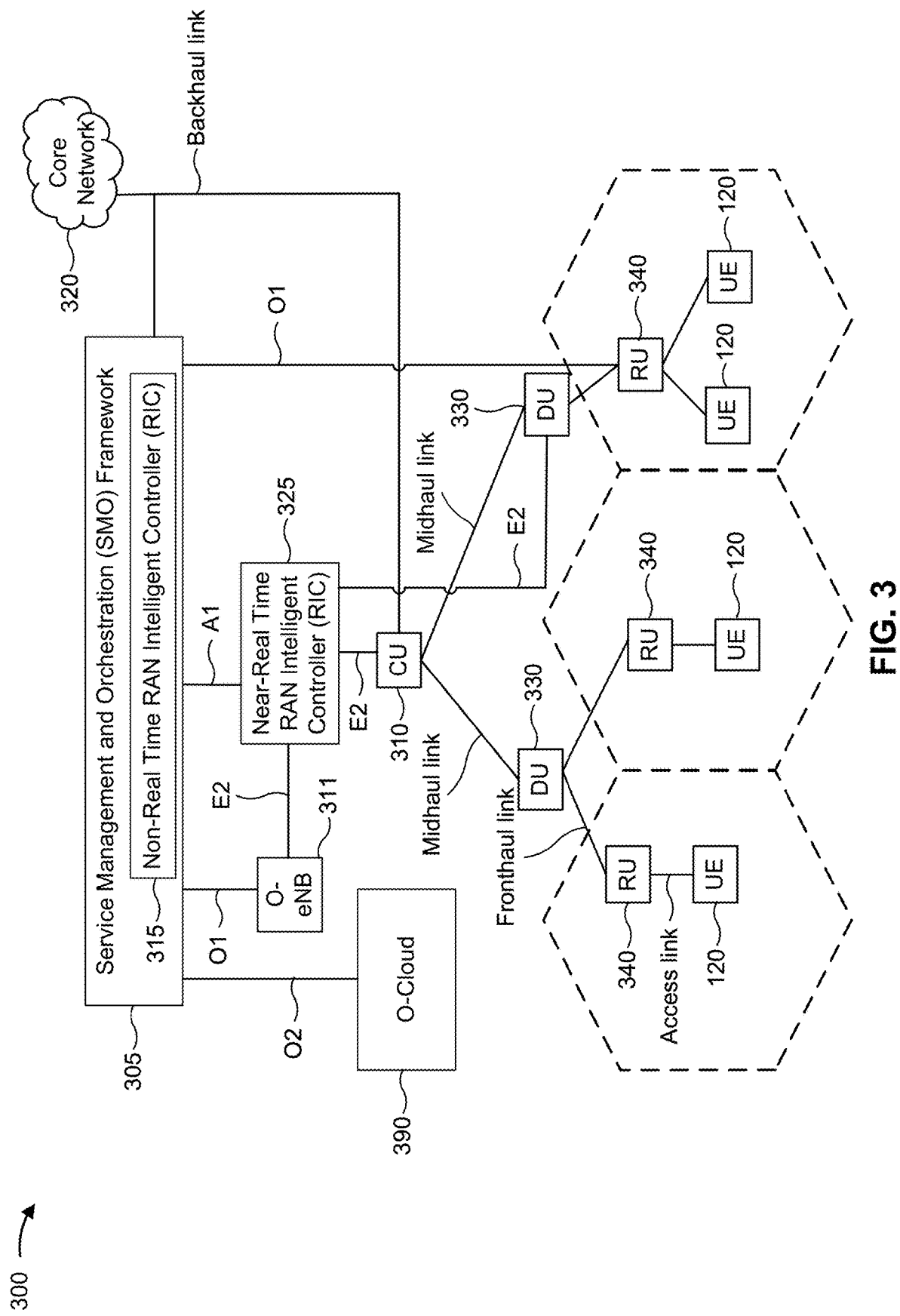
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
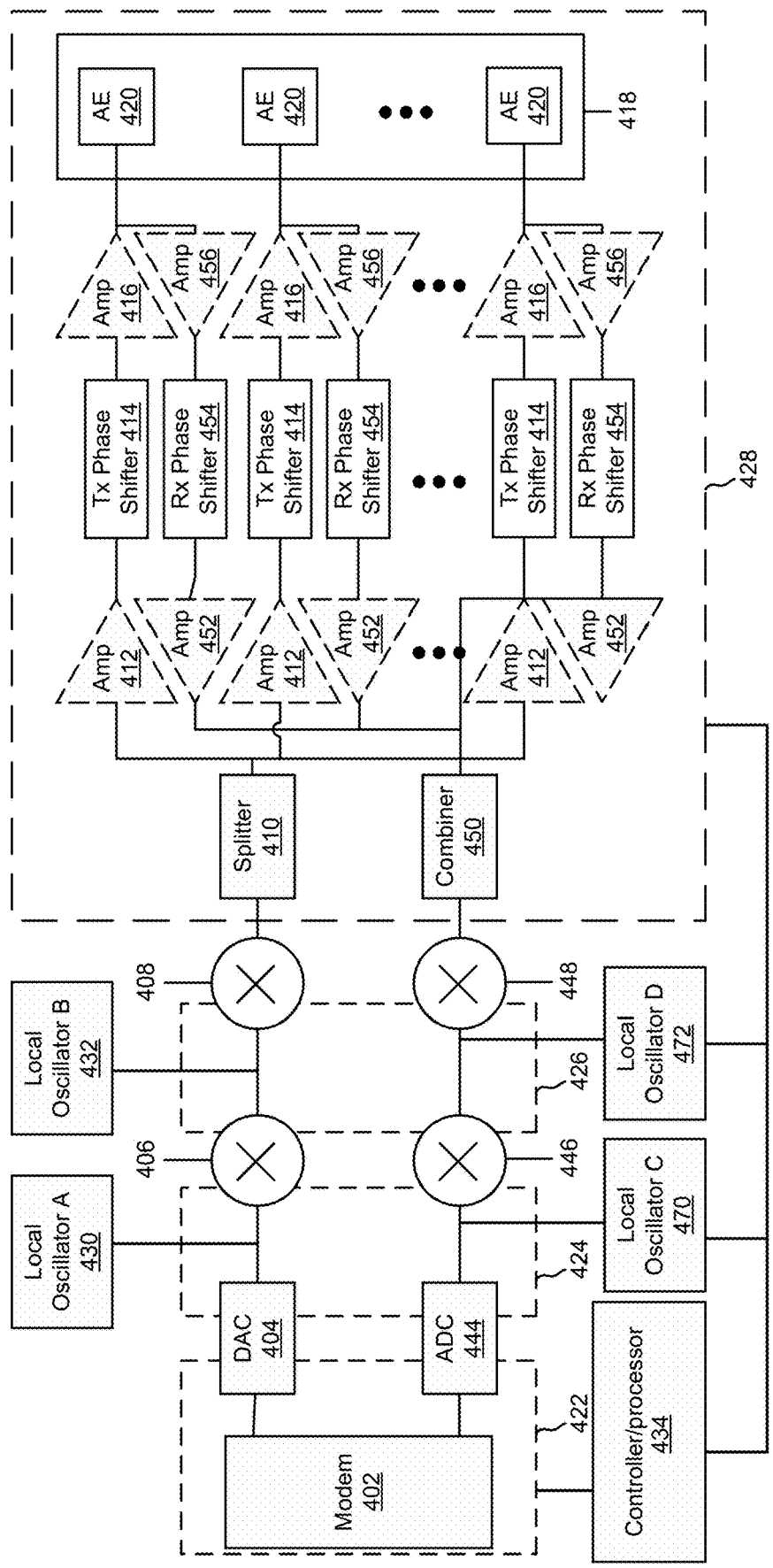
FIG. 4 is a diagram illustrating an example beamforming architecture that supports beamforming for wireless communications, in accordance with the present disclosure.

FIG. 4 is a diagram illustrating an example beamforming architecture 400 that supports beamforming for wireless communications, in accordance with the present disclosure. In some aspects, architecture 400 may implement aspects of the wireless network 100. In some aspects, architecture 400 may be implemented in a transmitting device (e.g., a first wireless communication device, UE, an RU, or network node) and/or a receiving device (e.g., a second wireless communication device, UE, an RU, or network node), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not use the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

Figure 5:
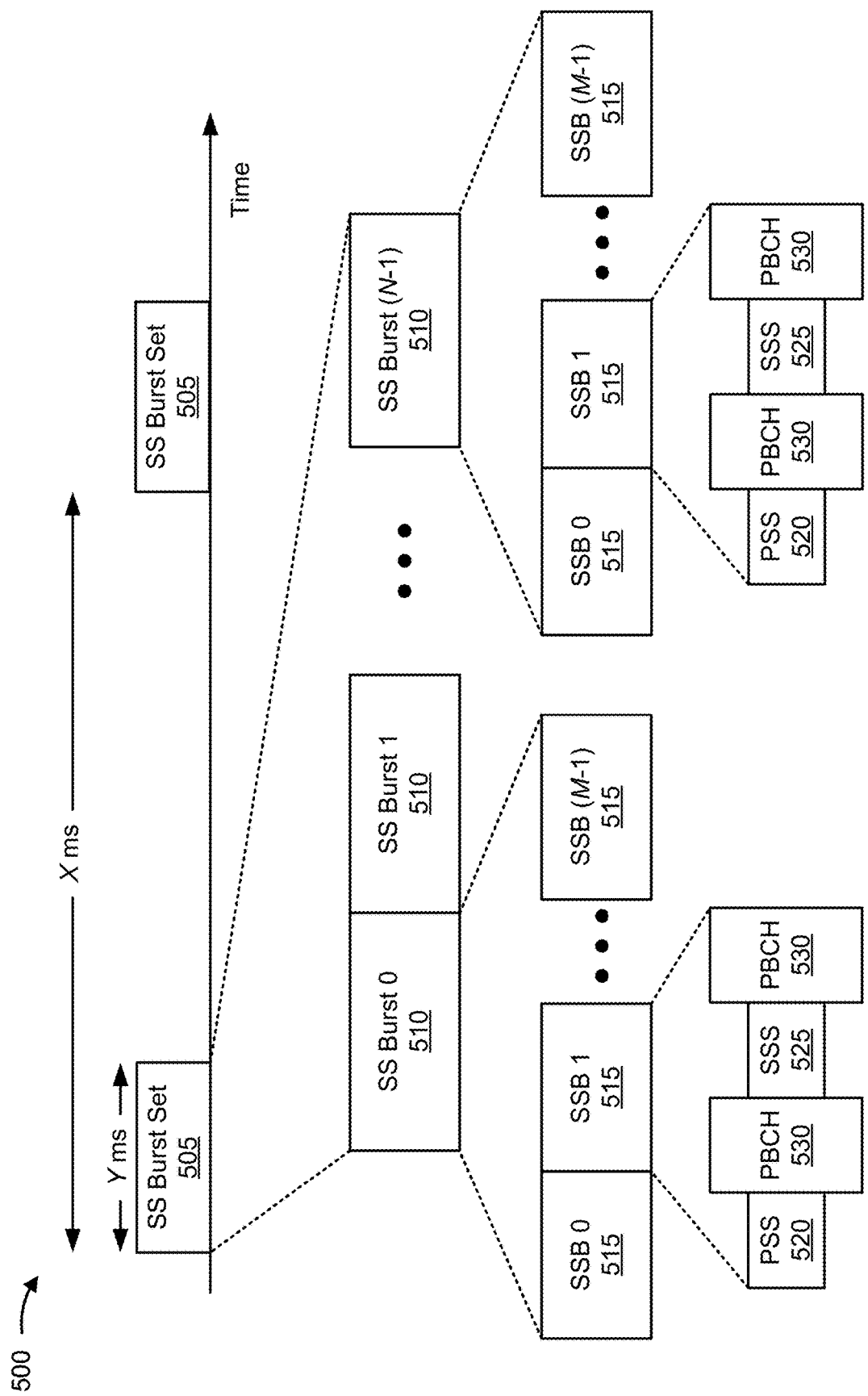
FIG. 5 is a diagram illustrating an example of a synchronization signal (SS) hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by one or more network nodes. As further shown, each SS burst 510 may include one or more SS blocks (SSBs) 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., a network node 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a PSS 520, an SSS 525, and/or a physical broadcast channel (PBCH) 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., a network node 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a network node 110 (e.g., directly or via one or more other network nodes). The network node 110 and the UE 120 may use the one or more indicated SSBs 515 to select one or more beams to be used for communication between the network node 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
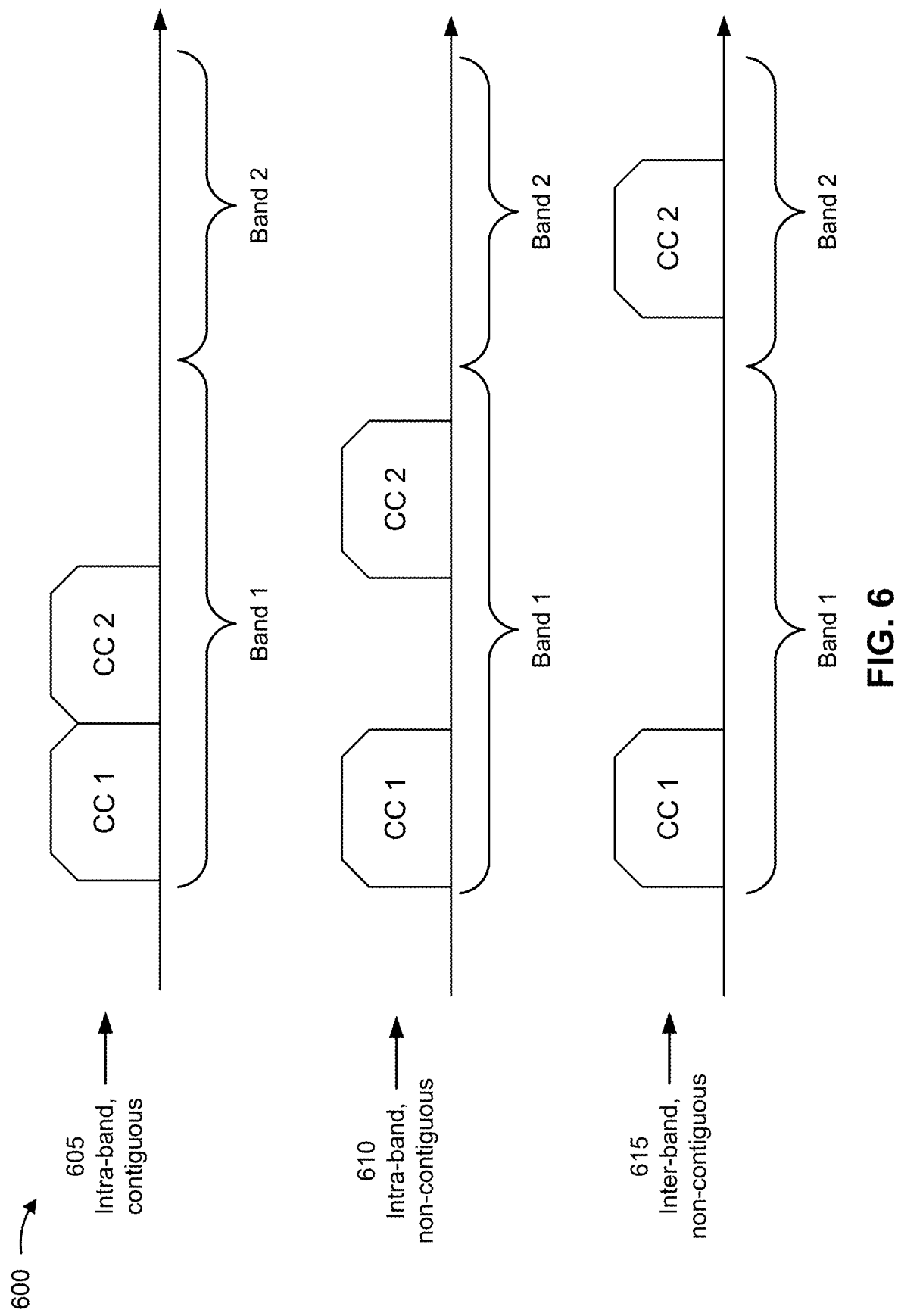
FIG. 6 is a diagram illustrating examples of carrier aggregation, in accordance with the present disclosure.

FIG. 6 is a diagram illustrating examples 600 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in an RRC message, downlink control information (DCI), and/or another signaling message (e.g., directly or via one or more other network nodes).

As shown by reference number 605, in some aspects, carrier aggregation may be configured in an intra-band contiguous mode where the aggregated carriers are contiguous to one another and are in the same band. As shown by reference number 610, in some aspects, carrier aggregation may be configured in an intra-band non-contiguous mode where the aggregated carriers are non-contiguous to one another and are in the same band. As shown by reference number 615, in some aspects, carrier aggregation may be configured in an inter-band non-contiguous mode where the aggregated carriers are non-contiguous to one another and are in different bands.

In carrier aggregation, a UE 120 may be configured with a primary carrier or PCell and one or more secondary carriers or SCells. In some aspects, the primary carrier may carry control information (e.g., downlink control information and/or scheduling information) for scheduling data communications on one or more secondary carriers, which may be referred to as cross-carrier scheduling. An SCell or secondary carrier may be used to increase throughput and/or data capacity for a UE. In other words, the UE may obtain control information via the PCell and may transmit data via the PCell and one or more SCells. In some aspects, a carrier (e.g., a primary carrier or a secondary carrier) may carry control information for scheduling data communications on the carrier, which may be referred to as self-carrier scheduling or carrier self-scheduling.

In some examples, for inter-band carrier aggregation, a primary cell may be associated with a first frequency band and a secondary cell may be associated with a second frequency band, where the first frequency band is associated with a lower frequency than the second frequency band. For example, the primary cell may be associated with an FR1 band, an FR2 band, or an FR4 band, among other examples, and the secondary cell may be associated with a sub-THz band. In some examples, due to a reduced coverage area of the secondary cell (e.g., caused by using the higher frequency band), the UE may rely on a connection with the primary cell to obtain information associated with the secondary cell. For example, a secondary cell deployment may rely on primary cell connectivity to support a power efficient sub-THz deployment with a burst activity pattern on the secondary cell. In some example, the secondary cell (e.g., the sub-THz cell) may be collocated with the primary cell (e.g., the primary cell and the secondary cell may be associated with the same network node or network nodes that are collocated). In other examples, the secondary cell may not be collocated with the primary cell.

As indicated above, FIG. 6 is provided as an example. Other examples may differ from what is described with regard to FIG. 6.

Figure 7:
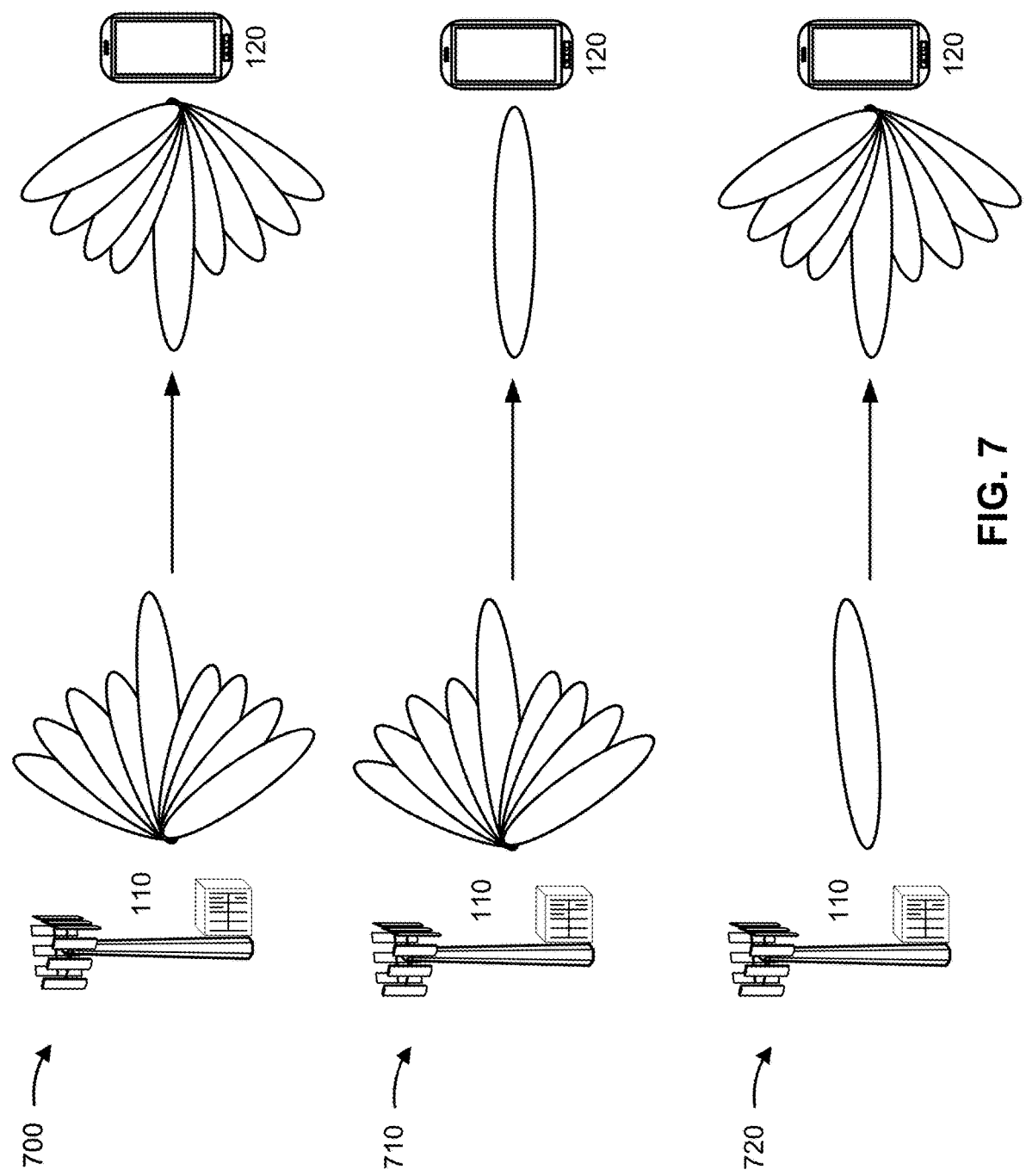
FIG. 7 is a diagram illustrating examples of beam management procedures, in accordance with the present disclosure.

FIG. 7 is a diagram illustrating examples 700, 710, and 720 of beam management procedures, in accordance with the present disclosure. As shown in FIG. 7, examples 700, 710, and 720 include a UE 120 in communication with a network node 110 in a wireless network (e.g., wireless network 100). However, the devices shown in FIG. 7 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 7, example 700 may include a network node 110 (e.g., one or more network node devices such as an RU, a DU, and/or a CU, among other examples) and a UE 120 communicating to perform beam management using channel state information (CSI) reference signals (CSI-RSs) and/or SSBs. Example 700 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 7 and example 700, CSI-RSs may be configured to be transmitted from the network node 110 to the UE 120. The CSI-RSs may be configured to be periodic (e.g., using RRC signaling), semipersistent (e.g., using media access control (MAC) control element (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 700 has been described in connection with CSI-RSs, the first beam management process may also use SSBs for beam management in a similar manner as described above.

As shown in FIG. 7, example 710 may include a network node 110 and a UE 120 communicating to perform beam management using CSI-RSs. Example 710 depicts a second beam management procedure (e.g., P2 beam management). The second beam management procedure may be referred to as a beam refinement procedure, a network node beam refinement procedure, a TRP beam refinement procedure, and/or a transmit beam refinement procedure. As shown in FIG. 7 and example 710, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120. While example 710 has been described in connection with CSI-RSs, the second beam management process may also use SSBs for beam management in a similar manner as described above As shown in FIG. 7, example 720 depicts a third beam management procedure (e.g., P3 beam management). The third beam management procedure may be referred to as a beam refinement procedure, a UE beam refinement procedure, and/or a receive beam refinement procedure. As shown in FIG. 7 and example 720, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams). While example 720 has been described in connection with CSI-RSs, the third beam management process may also use SSBs for beam management in a similar manner as described above.

In some network deployments, cells may be deployed that operate using high frequency bands, such as the EHF band, FR3, FR4, FR5, a sub-THz band (e.g., which may include frequencies that are multiple hundreds of GHz, such as 100 GHz-300 GHz), and/or other high frequency bands. The cells operating using high frequency bands may be referred to herein as "high-band cells." The high-band cells may provide increased data capacity and/or increased throughput for UEs (e.g., because of an increased bandwidth associated with the high frequency bands). For example, a UE 120 and a network node 110 associated with a high-band cell may communicate using a larger bandwidth size, such as a 7.5 GHz bandwidth, among other examples. Communicating using the larger bandwidth size may result in an increased throughput for communications between the UE 120 and the network node 110.

RF constraints and propagation properties that are unique to the high frequency bands may introduce new design challenges for wireless networks. For example, the high frequency bands may be associated with a high path loss. Therefore, to compensate for the high path loss, the network node 110 and the UE 120 may communicate using narrow beams (for example, beams with a narrow beam width or signals with energy concentrated over a narrow directional range). In such examples, spatial division multiplexing (SDM) may be used (for example, where different, spatially separable antenna beams are formed for different UEs). However, the narrow beams may be suspectable to beam blockage, interference, or other intervening factors that degrade performance of signals communicated via the narrow beams. Therefore, high-band cells may be associated with a smaller coverage area (e.g., a geographic area associated with a cell) as compared to cells using a lower operating frequency (e.g., which may be referred to herein as "low-band cells"). Because of the smaller coverage area of high-band cells, in some network deployments, high-band cells may be more densely distributed in the wireless network as compared to low-band cells. For example, multiple high-band network nodes (e.g., multiple RUs) may be deployed within a coverage area of a single low-band network node (e.g., within a coverage area of a low-band cell).

Additionally, high frequency (e.g., sub-THz) operations may be associated with a decreased efficiency of a power amplifier of the UE or network node. For example, a power amplifier power may decrease as a function of frequency and as a function of bandwidth. Therefore, high frequency (e.g., sub-THz) operations may be associated lower power amplifier power and lower power amplifier efficiency. This may result in a reduced effective isotropic radiated power (EIRP) that a device is capable of producing, resulting in the reduced coverage for high-band cells. As another example, high frequency (e.g., sub-THz) operations may be associated with increased power consumption. For example, high frequency (e.g., sub-THz) operations may be associated with a larger bandwidth (e.g., due to a larger subcarrier spacing) and high data rates. The larger bandwidth, coupled with less power efficient RF processing, increased sampling rates (e.g., for an ADC or a DAC), increased digital processing rates, increased bit rates, and/or increased storage or memory requirements, among other examples, may increase power consumption of wireless communication devices using the high frequency bands, such as the sub-THz band.

The poor coverage, increased power consumption, and narrow beams associated with high-band cells (e.g., sub-THz cells or other high-band cells) may introduce challenges for beam management. For example, as operational frequencies increase from mmW frequency ranges to sub-THz frequency ranges, beam widths may decrease (e.g., linearly) while a quantity of beams may increase (e.g., quadratically). In other words, to support high frequency band operations, such as sub-THz operations, a quantity of antenna elements in an antenna panel may be increased (e.g., to support forming an increased quantity of beams and/or narrower beams). For example, when increasing from an operating frequency of 28 GHz to 140 GHz, a ⅕ beam width reduction may result in 25 times (e.g., ×25) more beams for the same array area (e.g., for the same antenna panel). With such a large quantity of beams available, a signaling overhead associated with beam management procedures may be increased (e.g., due to a UE and/or a network node having to scan or sweep over a large quantity of narrow beams, in a similar manner as described above in connection with FIG. 7). Additionally, the increased quantity of beams may introduce latency associated with performing beam management procedures via the increased quantity of beams. Further, because the high frequency operations may be associated with an increased power consumption, performing beam management over the increased quantity of beams may consume significant power resources of wireless communication devices.

Some techniques and apparatuses described herein enable PCell beam-based SCell beam indications. For example, a UE may communicate (e.g., transmit and/or receive), with a primary cell, one or more signals using a first beam that is associated with a first spatial direction. The UE may measure a subset of beams from a set of beams associated with a secondary cell, where the subset of beams is selected based at least in part on the first beam and/or the first spatial direction. The UE may establish a connection with the secondary cell using a second beam from the subset of beams based at least in part on the measurements of the subset of beams.

As a result, the UE may measure a reduced quantity of beams for the secondary cell based at least in part on selecting the subset of beams based at least in part on the first beam and/or the first spatial direction used with the primary cell. This may reduce a power consumption and/or signaling overhead associated with performing beam management with the secondary cell. Therefore, a power efficiency of beam management with the secondary cell may be improved.

For example, the primary cell may be associated with a first operating frequency or a first RAT, and the secondary cell may be associated with a second operating frequency or a second RAT. The UE may use knowledge of digital precoding and/or a selected analog beam that is used to communicate with the primary cell in order to estimate a coarse beam direction for the link activation with the secondary cell. In some aspects, the UE may indicate, to a network node (e.g., to the primary cell) an indication of a quantity of beams (e.g., a quantity of beams included in the subset of beams) that are used for beam management with the secondary cell (e.g., based at least in part on the first beam and/or the first spatial direction). The UE may be configured with an SSB burst (e.g., a mini-burst) that is associated with a quantity of repetitions (e.g., where the quantity of repetitions is based at least in part on the quantity of beams indicated by the UE) and a quantity of SSBs (e.g., where the quantity of SSBs is based at least in part on a quantity of Tx beams of the secondary cell that are included in an angular spread of the first beam and/or the first spatial direction). The UE may receive (e.g., from the secondary cell) and/or measure the SSBs received via the SSB burst to perform beam management with the secondary cell.

As indicated above, FIG. 7 is provided as an example of beam management procedures. Other examples of beam management procedures may differ from what is described with respect to FIG. 7. For example, the UE 120 and the network node 110 may perform the third beam management procedure before performing the second beam management procedure, and/or the UE 120 and the network node 110 may perform a similar beam management procedure to select a UE transmit beam.

Figure 8:
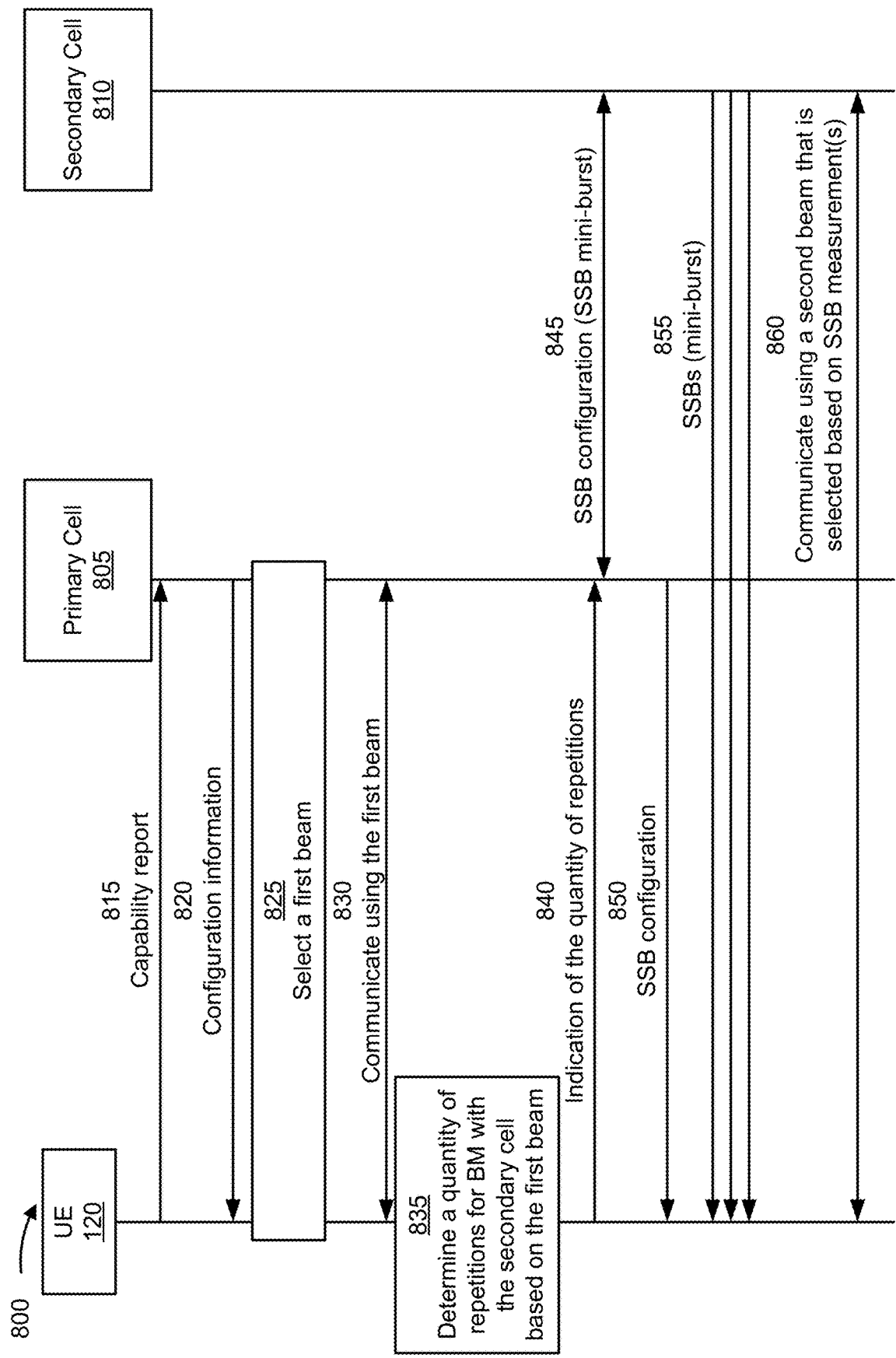
FIG. 8 is a diagram illustrating an example associated with primary cell (PCell) beam-based secondary cell (SCell) beam indications, in accordance with the present disclosure.

FIG. 8 is a diagram illustrating an example 800 associated with PCell beam-based SCell beam indications, in accordance with the present disclosure. As shown in FIG. 8, a primary cell 805 (e.g., associated with a network node 110, a base station, a CU, a DU, and/or an RU) and/or secondary cell 810 (e.g., associated with a network node 110, a base station, a CU, a DU, and/or an RU) may communicate with a UE 120. In some aspects, the primary cell 805, the secondary cell 810, and the UE 120 may be part of a wireless network (e.g., the wireless network 100).

In some aspects, the primary cell 805 may be associated with a first operating frequency range and/or a first RAT. The secondary cell 810 may be associated with a second operating frequency range and/or a second RAT. For example, the primary cell 805 may be a low-band cell (e.g., a 5G cell and/or a cell operating using an operating frequency included in FR1, FR2, and/or FR4), and the secondary cell 810 may be a high-band cell (e.g., a 6G cell and/or a cell operating using an operating frequency included the EHF band, and/or a sub-THz band). The primary cell 805 may be associated with a primary carrier (e.g., a primary CC), and the secondary cell 810 may be associated with a secondary carrier (e.g., a secondary CC). For example, the UE 120 may be configured to communicate with the primary cell 805, and the secondary cell 810 via an inter-band carrier aggregation configuration (e.g., in a similar manner as described above in connection with FIG. 6).

In some aspects, the primary cell 805 and the secondary cell 810 may be associated with different network nodes. In other aspects, the primary cell 805 and the secondary cell 810 may be associated with at least one common network node. For example, the primary cell 805 may be associated with a first RU, a first base station, and/or a first DU. The secondary cell 810 may be associated with a second RU, a second base station, and/or a second DU. The primary cell 805 and the secondary cell 810 may be associated with the same control entity, such as the same DU and/or the same CU. Alternatively, the primary cell 805 and the secondary cell 810 may be associated with different control entities.

In some aspects, the primary cell 805 and the secondary cell 810 may be collocated. For example, one or more network nodes supporting the primary cell 805 and the secondary cell 810 may be collocated. As an example, antenna panel(s) associated with the primary cell 805 and antenna panel(s) associated with the secondary cell 810 may be collocated. Additionally, or alternatively, antenna panel(s) associated with the primary cell 805 and antenna panel(s) associated with the secondary cell 810 may be associated with the same boresight (e.g., the same steering angle and/or the boresight direction). Further, antenna panel(s) used by the UE 120 to communicate with the primary cell 805 and the secondary cell 810 may be collocated and/or associated with the same boresight. This may enable the UE 120, the primary cell 805 and/or the secondary cell 810 to identify beams to be used to be used for communications between the UE 120 and the secondary cell 810 based at least in part on a beam used for communications between the UE 120 and the primary cell 805, as described in more detail elsewhere herein.

In some aspects, actions described herein as being performed by a cell (or a network node) may be performed by multiple different network nodes. For example, configuration actions may be performed by a first network node (for example, a CU or a DU), and radio communication actions may be performed by a second network node (for example, a DU or an RU). As used herein, a network node 110 (or a cell) "transmitting" a communication to the UE 120 may refer to a direct transmission (e.g., from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 (or a cell) may refer to a direct transmission (e.g., from the UE 120 to the network node 110) or an indirect transmission via one or more other network nodes or devices. For example, if the network node 110 is a DU, an indirect transmission to the network node 110 may include the UE 120 transmitting a communication to an RU, and the RU transmitting the communication to the DU. Additionally, the UE 120 receiving a communication from, or transmitting a communication to, a cell may refer to the UE 120 receiving the communication from, or transmitting the communication to, a network node associated with the cell.

In some aspects, as shown by reference number 815, the UE 120 may transmit, and the primary cell 805 (and/or the secondary cell 810) may receive, a capability report. The capability report may indicate that the UE 120 supports enhanced beamforming operations for the secondary cell, as described in more detail elsewhere herein. For example, the UE 120 may transmit an indication that the UE 120 supports identifying beams to be associated with a beam management procedure with the secondary cell 810 via a beam used to communicate with the primary cell 805, as described in more detail elsewhere herein. In other words, the UE 120 may transmit an indication that the UE 120 supports performing one or more operations described herein.

As shown by reference number 820, the primary cell 805 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., stored by the UE 120 and/or previously indicated to the UE 120) for selection by the UE 120, and/or explicit configuration information for the UE 120 to use to configure itself, among other examples.

In some aspects, the configuration information may indicate that the UE 120 is to identify a subset of beams, from a set of beams associated with communicating with the secondary cell 810, that are to be used for initial access and/or beam management with the secondary cell 810 based at least in part on a beam or spatial direction used to communicate with the primary cell 805. For example, the configuration information may indicate that the secondary cell is to transmit custom SSB mini-bursts where a quantity of repetitions of the SSB mini-bursts and/or beams associated with the SSB mini-bursts are based at least in part on a beam or spatial direction used by the UE 120 to communicate with the primary cell 805. In some examples, a configuration of a custom SSB mini-burst may include time gap (e.g., X milliseconds) between two consecutive SSBs and/or a time gap (e.g., Y milliseconds) between two consecutive SS bursts.

In some aspects, the configuration information may indicate that the UE 120 is to measure SSBs or other reference signals, transmitted via the secondary cell 810, associated with a subset of beams from the set of beams associated with the secondary cell 810. The configuration information may indicate that the subset of beams may be selected (e.g., by the UE 120 and/or the primary cell 805) based at least in part on the first beam or the first spatial direction used by the UE 120 to communicate with the primary cell 805. The configuration information may indicate that the subset of beams is to be selected based at least in part on an angular spread of the first beam or the first spatial direction used by the UE 120 to communicate with the primary cell 805.

The UE 120 may configure itself based at least in part on the configuration information. In some aspects, the UE 120 may be configured to perform one or more operations described herein based at least in part on the configuration information.

As shown by reference number 825, the UE 120 and/or the primary cell 805 (e.g., a network node associated with the primary cell 805) may select a first beam for communications between the UE 120 and the primary cell. For example, the UE 120 may apply analog beamforming or digital beamforming to generate beams associated with the primary cell 805 (e.g., beams available to be used for communications with the primary cell 805). The first beam may be associated with a first spatial direction. The UE 120 and/or the network node associated with the primary cell 805 may determine and/or select the first beam or the first spatial direction as described in more detail below. In some aspects, both the UE 120 and the network node associated with the primary cell 805 may determine and/or select the first beam or the first spatial direction. In other aspects, a first device (e.g., one of the UE 120 or the he network node associated with the primary cell 805) may determine and/or select the first beam or the first spatial direction and may transmit an indication of the first beam or the first spatial direction to a second device (e.g., the other of the UE 120 or the he network node associated with the primary cell 805).

As shown by reference number 830, the UE 120 and the primary cell 805 may communicate one or more signals using the first beam that is associated with the first spatial direction. For example, the UE 120 may establish a connection with the primary cell 805. The UE 120 and the primary cell 805 may perform a beam management procedure (e.g., in a similar manner as described in connection with FIG. 7) to select a beam pair (e.g., a UE beam and a network node beam) to be used for communications between the UE 120 and the primary cell 805. The UE 120 may communicate with the first cell using the first beam (e.g., signals may be transmitted and/or received by the UE 120 in the first spatial direction).

As shown by reference number 835, the UE 120 may determine a quantity of repetitions to be associated with a beam management (BM) procedure with the secondary cell 810 based at least in part on the first beam and/or the first spatial direction. For example, the UE 120 may determine the quantity of repetitions based at least in part on a quantity of beams available for the UE 120 to communicate with the secondary cell 810 that are spatially directed in the first spatial direction. For example, the UE 120 and the primary cell 805 may communicate using wider beams than beams used by the UE 120 to communicate with the secondary cell 810 (e.g., because the primary cell may be associated with a lower operating frequency than an operating frequency associated with the secondary cell 810). Therefore, there may be multiple beams (e.g., configured for communicating with the secondary cell 810) directed in a spatial direction that is within an angular spread of the first beam.

The UE 120 may identify a subset of beams, from a set of beams available or configured for communicating with the secondary cell 810, based at least in part on the first beam and/or the first spatial direction. For example, an association may map beams associated with the primary cell 805 to beams associated with the secondary cell 810. The UE 120 may store an indication of the association. In some aspects, the association may be based at least in part on a beamforming technique applied by the UE 120. For example, the UE 120 may apply analog beamforming or digital beamforming to generate beams associated with the primary cell 805 (e.g., beams available to be used for communications with the primary cell 805). Analog beamforming may include using phase shifters to provide the same signal to multiple antenna elements, where the signal is provided with different phases for each antenna element. Digital beamforming may precode different signals for each antenna element in a digital baseband. For example, in analog beamforming, amplitude and/or phase variation is applied to an analog signal at a transmitter. The signals from different antennas are summed up before the ADC conversion in analog beamforming at the receiver. In digital beamforming, amplitude and/or phase variation is applied to a digital signal before DAC conversion at a transmitter. The reverse process is done after ADC operations are performed.

If analog beamforming is used, the UE 120 may identify an analog beam used to transmit and/or receive communications with the primary cell 805. The UE 120 may identify the subset of beams based at least in part on an association between the analog beam and the subset of beams. To keep the above beam association applicable, the UE 120 may assume a same boresight and co-located/close placement for antenna elements and/or antenna panels used to communicate with the primary cell 805 and the secondary cell 810. If there is a difference a boresight in antenna panels, the difference may be taken in account when determining the subset of beams. For example, the UE 120 may include additional beams in the subset of beams (e.g., to include beams that are associated with a spatial direction outside of, but close to, the first spatial direction and/or the angular spread of the first beam).

If digital beamforming is used by the UE 120, then the UE 120 and/or the primary cell 805 may determine the first spatial direction and/or a propagation path direction based at least in part on digital precoding information. For example, the first spatial direction may be indicated based at least in part on information included in a precoding matrix that is associated with the one or more signals communicated between the UE 120 and the primary cell 805. For example, the UE 120 may use a downlink precoding matrix and/or an uplink precoding matrix to determine the first spatial direction. The downlink precoding matrix may include elements and/or values that are associated with, or that indicate, strongest transmit steering vectors and co-phasic coefficients for different subarrays or antenna panels. Therefore, the steering directions (e.g., steering vectors) indicated by the precoding matrix may be used to determine the first spatial direction and/or the subset of beams.

As another example, the UE 120 and/or the primary cell 805 may exploit Rx to Tx antenna reciprocity to determine the first spatial direction. For example, the first spatial direction may be indicated based at least in part on an extracted phase vector associated with the one or more signals communicated between the UE 120 and the primary cell 805. For example, the UE 120 and/or the primary cell 805 may extract a phase, for each receive antenna, of a strongest tap of a time domain channel response received by the UE 120 and/or the primary cell 805. In some aspects, a filter may use a set of taps. A tap may be based at least in part on a weight to be applied to a tone or a resource block. In some aspects, a device (e.g., the UE 120 and/or a network node) may estimate a time domain channel response and identify a strongest time domain path for each receive antenna and extract a corresponding vector of phases. For example, channel estimation may be performed (e.g., by the UE 120 using a downlink reference signal and/or by the primary cell 805 using an uplink reference signal) to identify a strongest tap. The UE 120 and/or the primary cell 805 may determine the first spatial direction with respect to the extracted vector of phases (e.g., a phase from each receive antenna). For example, the UE 120 and/or the primary cell 805 may determine phase ramp that aligns with, or fits to, the extracted vector of phases to determine the first spatial direction.

As another example, the UE 120 and/or the primary cell 805 may determine the first spatial direction from a singular value decomposition (SVD) of a channel associated with the one or more signals communicated between the UE 120 and the primary cell 805. For example, the UE 120 and/or the primary cell 805 may perform the SVD of the channel to determine the first spatial direction. For example, the UE 120 and/or the primary cell 805 may perform an SVD of an un-precoded channel response to determine a strongest path direction (e.g., an eigenvector from one or more matrices) for the Rx and Tx path directions. For example, the channel response may be estimated based at least in part on receiving a CSI-RS (e.g., by the UE 120) or on receiving a sounding reference signal (SRS) (e.g., by the primary cell 805). If the UE 120 performs the SVD of the estimated channel response, then the UE 120 may transmit, and the primary cell 805 may receive, an indication of the first spatial direction. If the primary cell 805 performs the SVD of the channel, then the UE 120 may receive, and the primary cell 805 may transmit, an indication of the first spatial direction (e.g., where the first spatial direction is determined based at least in part on the SVD of the estimated channel response).

The UE 120 may determine the subset of beams that are to be measured by the UE 120 as part of a beam management procedure for the secondary cell 810 based at least in part on the first spatial direction (e.g., that is used to communicate with the primary cell 805). For example, the subset of beams may be beams that are included within an angular spread of the first beam and/or the first spatial direction. As another example, the subset of beams may be beams that are directed in the same, or a similar, direction as the first spatial direction. As described above, in some aspects, the UE 120 may store an association between a first set of beams (e.g., used to communicate with the primary cell 805) and a second set of beams (e.g., used to communicate with the secondary cell 810), where the first set of beams is wider than the second set of beams. The association may indicate, for a given beam from the first set of beams, one or more beams from the second set of beams that are associated with a similar spatial direction as the given beam. The UE 120 may determine the subset of beams (e.g., one or more beams) to be associated with the beam management procedure for the secondary cell 810 based at least in part on the association and the first beam used to communicate with the primary cell 805.

As shown by reference number 840, the UE 120 may transmit, and the primary cell 805 may receive, an indication of a quantity of repetitions to be associated with a beam management procedure for the secondary cell. The quantity of repetitions may be based at least in part on a quantity of beams, included in the subset of beams, that are associated with the first spatial direction. For example, as part of the beam management procedure, the UE 120 may measure one or more signals (e.g., SSBs or another reference signal) transmitted via the secondary cell 810 using each beam included in the subset of beams. Therefore, if there are L beams included in the subset of beams, the secondary cell 810 may repeat the transmission of the one or more signals so that the UE 120 can perform L measurements of the one or more signals, where the UE 120 uses a given beam from the L beams to measure signals in a given repetition. For example, the UE 120 may indicate or report to the primary cell 805 the quantity of repetitions of transmissions (e.g., SSB transmission or another reference signal transmission) that are used by the UE 120 to perform a receive beam sweep using the subset of beams. The quantity of beams included in the subset of beams may be based at least in part on a beam width and/or angular direction granularity of the second set of beams (e.g., used to communicate with the secondary cell 810) relative to the first set of beams (e.g., used to communicate with the primary cell 805).

The primary cell 805 (e.g., a network node associated with the primary cell 805, such as a CU or a DU) may determine an SSB configuration (e.g., a beam management configuration) for the secondary cell 810 and the UE 120. For example, the primary cell 805 may determine the SSB configuration based at least in part on the first beam, the first spatial direction, and/or the quantity of repetitions indicated by the UE 120, among other examples. For example, the primary cell 805 may determine a subset of Tx beams associated with the secondary cell 810 that are associated with the first spatial direction (e.g., used by the primary cell 805 to communicate with the UE 120). The primary cell 805 may determine the subset of Tx beams in a similar manner as described above in connection with the UE 120 determining the subset of beams (e.g., subset of Rx beams). For example, the primary cell 805 may identify one or more beams (e.g., Tx beams) to be used by the secondary cell 810 as part of a beam management procedure with the UE 120, where the one or more beams are included in, or are close to, an angular spread of a beam used by the primary cell 805 to communicate with the UE 120. This may enable the quantity of beams used by the secondary cell 810 for the beam management procedure to be reduced, thereby conserving network resources and/or power resources, among other examples.

For example, the primary cell 805 may determine one or more reference signals (e.g., SSBs or another downlink reference signal) to be transmitted by the secondary cell 810 for the beam management procedure with the UE 120. A quantity of the one or more reference signals may be the quantity of the one or more beams (e.g., Tx beams) to be used by the secondary cell 810 as part of a beam management procedure with the UE 120 (e.g., determined by the primary cell 805 as described above). For example, the SSB configuration may configure an SSB mini-burst. An SSB mini-burst may be a burst of SSB transmissions that uses less than all of the available Tx beams of a cell. The SSB mini-burst may be custom to the UE 120 because the beams used to transmit the SSBs in the SSB mini-burst may be the one or more beams (e.g., Tx beams) that are associated with the first spatial direction (e.g., used by the primary cell 805 to communicate with the UE 120). Additionally, the primary cell 805 may configure the secondary cell 810 to repeat the SSB mini-burst (e.g., to repeat transmissions of the one or more SSBs using the one or more Tx beams) a quantity of times (e.g., as indicated or requested by the UE 120). Therefore, the SSB mini-burst may be configured to be specific to the spatial direction between the UE 120 and the secondary cell 810. This may enable the quantity of beams used by the secondary cell 810 and the UE 120 for the beam management procedure to be reduced, thereby conserving network resources and/or power resources, among other examples.

As shown by reference number 845, the primary cell 805 may transmit, and the secondary cell 810 may receive, an indication of the SSB configuration. For example, the primary cell 805 may configure the secondary cell 810 to transmit one or more SSBs using the one or more Tx beams. Additionally, the primary cell 805 may configure the secondary cell 810 to transmit one or more repetitions of the one or more SSBs. The primary cell 805 may configure the secondary cell with one or more other parameters for the SSB configuration, such as a timing of the SSB mini-bursts, synchronization information, and/or burst length, among other examples.

As shown by reference number 850, the primary cell 805 may transmit, and the UE 120 may receive, an indication of the SSB configuration. For example, the UE 120 may be configured with the customized SSB mini-burst parameters (e.g., that are customized based at least in part on the beam and/or spatial direction used for communications between the UE 120 and the primary cell 805). For example, the UE 120 may receive an indication of one or more parameters associated with a beam management procedure for the secondary cell 810. The one or more parameters may include a first quantity of signals (e.g., SSBs or another downlink reference signal) to be transmitted by the secondary cell 810 associated with the beam management procedure (e.g., where the first quantity of signals is based at least in part on a quantity of secondary cell transmit beams associated with the first spatial direction), a second quantity of repetitions to be associated with the signals (e.g., where the second quantity of repetitions is based at least in part on a quantity of UE receive beams that are associated with the first spatial direction), timing information associated with the SSB mini-bursts, an indication of a time gap between repetitions of the SSB mini-burst, and/or synchronization information, among other examples. In some aspects, a scheduling time may be provided with reference to timing of the primary cell 805 as a coarse timing reference for localized SSB detection (e.g., in time) on the secondary cell 810.

As shown by reference number 855, the secondary cell 810 may transmit, and the UE 120 may receive, one or more signals (e.g., SSBs or another downlink reference signal) in accordance with the SSB configuration. For example, for a first SSB mini-burst, the secondary cell 810 may perform a Tx beam sweep by transmitting one or more SSBs using the one or more Tx beams associated with the first spatial direction. The UE 120 may measure the one or more SSBs using a first Rx beam (e.g., from the subset of beams identified by the UE 120 as described in more detail elsewhere herein). For a second SSB mini-burst (e.g., a repetition of the SSB mini-burst), the secondary cell 810 may perform the Tx beam sweep by transmitting the one or more SSBs using the one or more Tx beams associated with the first spatial direction. The UE 120 may measure the one or more SSBs using a second Rx beam. The secondary cell 810 may transmit one or more repetitions of the SSB mini-burst to enable the UE 120 to measure the SSB mini-burst using each beam included in the subset of beams identified by the UE 120 as described in more detail elsewhere herein.

In other words, the UE 120 may measure a subset of beams (e.g., a subset of Rx beams) from a set of beams associated with a secondary cell 810. As described in more detail elsewhere herein, the subset of beams may be selected based at least in part on the first beam or the first spatial direction used for communications with the primary cell 805. For example, the UE 120 may measure one or more repetitions of an SSB mini-burst, where the UE 120 measures the repetitions using respective Rx beams from the subset of beams.

In some aspects, the UE 120 may transmit a measurement report indicating measurement values of the SSB mini-burst(s). In some aspects, the UE 120 may transmit the measurement report to a network node via the primary cell 805 (e.g., at an initial synchronization stage). In other aspects, the UE 12 may transmit the measurement report to a network node via the secondary cell 810 (e.g., if the UE is in a connected state (e.g., an RRC connected state) with the secondary cell 810). For example, the UE 120 may measure signals using the subset of beams, as described in more detail elsewhere herein.

As shown by reference number 860, the UE 120 and the secondary cell 810 may establish a connection using a beam from the subset of beams based at least in part on the measurements (e.g., performed by the UE 120) of the subset of beams. For example, the UE 120 may transmit, and the secondary cell 810 (or the primary cell 805) may receive, a measurement report indicating measurements of the repetitions of the SSB mini-bursts. The secondary cell 810 (or the primary cell 805) may identify a best beam pair (e.g., a UE Rx beam and a secondary cell Tx beam) based at least in part on the measurements of the repetitions of the SSB mini-bursts. The UE 120 and the UE 120 and the secondary cell 810 may communicate using the identified beam (or beam pair) based at least in part on performing beam management using the configured (e.g., custom) SSB mini-burst. In other words, after the SSB mini-burst repetitions, a refined serving beam (Tx and Rx beam pair) may be determined for communications between the UE 120 and the secondary cell 810. The UE 120 and the secondary cell 810 may communicate (e.g., transmit and/or receive) one or more signals using the serving beam.

In some aspects, the beam management procedure described above (e.g., using custom SSB mini-bursts) may be used for mobility purposes. For example, the UE 120 may receive an indication of one or more parameters associated with a beam tracking procedure for the secondary cell 810. The one or more parameters may be similar to the one or more parameters for the SSB configuration described above. For example, custom SSB mini-bursts may be configured for the beam tracking procedure for the secondary cell 810. In other words, in order to handle small drifts of the beams due to mobility during a communication session, additional SSB mini-burst transmissions in which Tx and Rx beams (e.g., that are associated with a similar spatial direction as a serving beam between the UE 120 and the secondary cell 810) may be measured in order find whether a better beam pair. The UE 120 may transmit a request indicating a quantity of beams to be measured for the beam tracking procedure (or the primary cell 805 may determine the quantity of beams). As described above, the quantity of beams to be measured by the UE 120 may indicate a quantity of repetitions of the SSB mini-bursts to be configured. The UE 120 may be configured the customized SSB mini-burst parameters for beam tracking including the scheduling time, quantity of Tx beams, and/or quantity of Rx beams (e.g., repetitions), among other examples.

As another example, the beam management procedure described above (e.g., using custom SSB mini-bursts) may be triggered based at least in part on a beam switch of a serving beam between the UE 120 and the primary cell 805. For example, a serving beam between the UE 120 and the primary cell 805 may be switched to the first beam (e.g., from another beam). Performing the beam management procedure described above may be based at least in part on the serving beam being switched. In other words, the UE 120 measuring the subset of beams may be based at least in part on the serving beam being switched. In other words, if a beam switch at the primary cell 805 is detected, an event driven synchronization and beam management session at the secondary cell 810 may be triggered.

As a result, the UE 120 may measure a reduced quantity of beams for the secondary cell based at least in part on selecting the subset of beams based at least in part on the first beam and/or the first spatial direction used with the primary cell 805. This may reduce a power consumption and/or signaling overhead associated with performing beam management with the secondary cell 810. Therefore, a power efficiency of beam management with the secondary cell 810 may be improved.

As indicated above, FIG. 8 is provided as an example. Other examples may differ from what is described with regard to FIG. 8.

Figure 9:
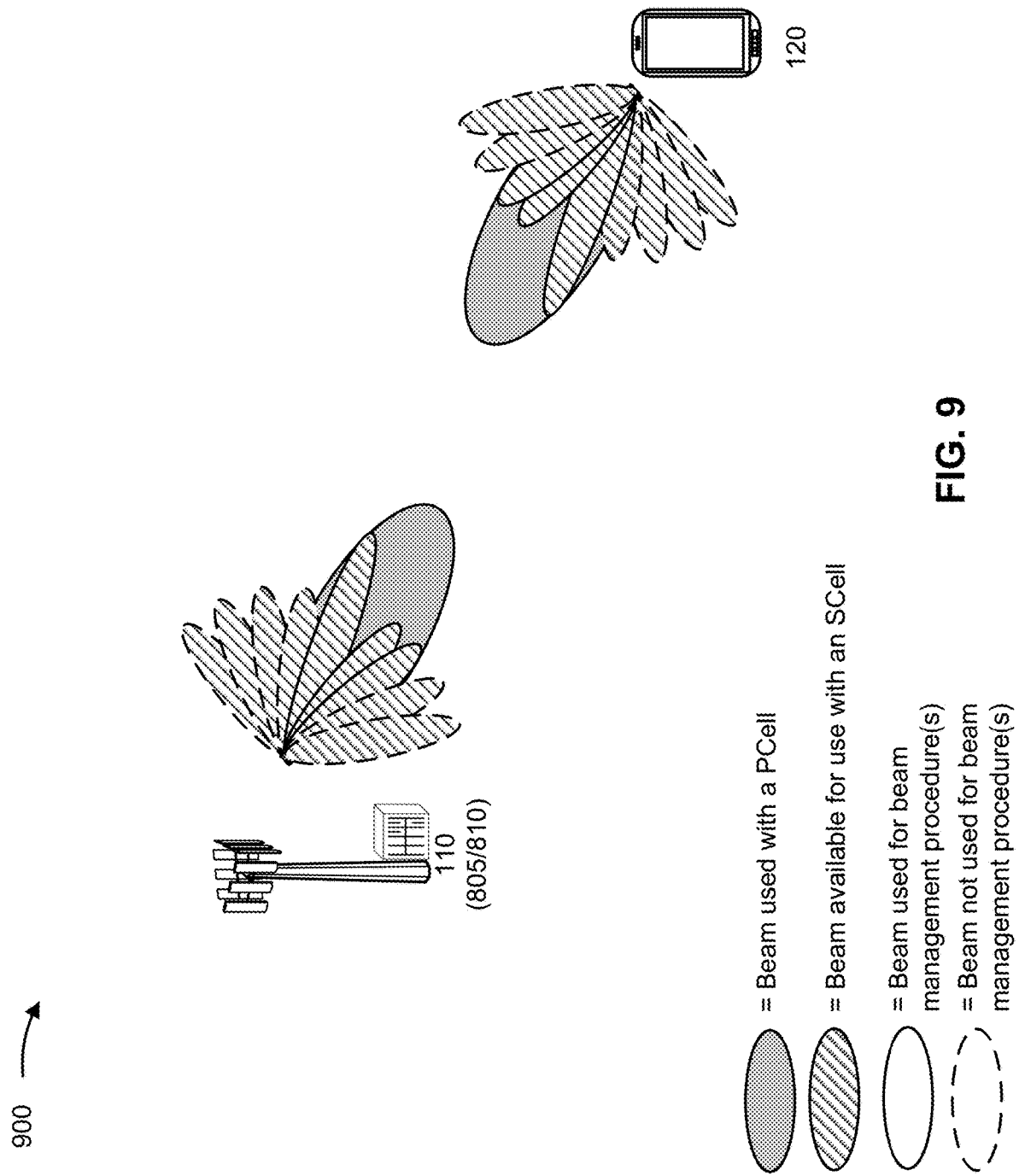
FIG. 9 is a diagram illustrating an example associated with beam associations for PCell beam-based SCell beam indications, in accordance with the present disclosure.

FIG. 9 is a diagram illustrating an example 900 associated with beam associations for PCell beam-based SCell beam indications, in accordance with the present disclosure. As shown in FIG. 9, the UE 120 may be associated with a set of beams (e.g., Rx beams). The UE 120 may be capable of forming beams associated with a PCell (e.g., the primary cell 805) and beams associated with an SCell (e.g., the secondary cell 810). As shown in FIG. 9, the beam(s) associated with the PCell may be wider than the beam(s) associated with the SCell. For example, the beam(s) associated with the PCell may have a larger angular spread than the beam(s) associated with the SCell.

A network node 110 may similar be capable of forming beams associated with a PCell (e.g., the primary cell 805) and beams associated with an SCell (e.g., the secondary cell 810). For example, as shown in FIG. 9, an antenna panel associated with the PCell may be collocated with, and/or have a same (or similar) boresight as, an antenna panel associated with the SCell (e.g., at the network node 110).

As shown in FIG. 9, Tx beams (e.g., at the network node 110) and Rx beams (e.g., at the UE 120) used for a beam management procedure between the SCell and the UE 120 may be based at least in part on a beam and/or spatial direction used for communications between the UE 120 and the PCell. For example, the UE 120 and the network node 110 may select a subset of beams (e.g., a subset of Tx beams at the network node 110 and a subset of Rx beams at the UE 120) to be used during the beam management procedure between the SCell and the UE 120. In some aspects, as shown in FIG. 9, the selected SCell beams may be beams included in an angular spread of a PCell beam used between the PCell and the UE 120.

As a result, the UE 120 and the network node 110 may use less than all available SCell beams during the beam management procedure between the SCell and the UE 120. Additionally, by selecting the Tx and Rx beams to be used during the beam management procedure between the SCell and the UE 120 based at least in part on a beam and/or spatial direction that is already being used between the UE 120 and the PCell, a likelihood that good beams (e.g., beams with high measurement values) will be measured during the beam management procedure may be increased. For example, the beam(s) omitted from the beam management procedure may have a high likelihood of being associated with poor measurement values because they are not associated with a similar spatial direction as the beam and/or spatial direction that is already being used between the UE 120 and the PCell. As a result, network resources may be conserved, and a power efficiency of the beam management procedure may be improved.

As indicated above, FIG. 9 is provided as an example. Other examples may differ from what is described with regard to FIG. 9.

Figure 10:
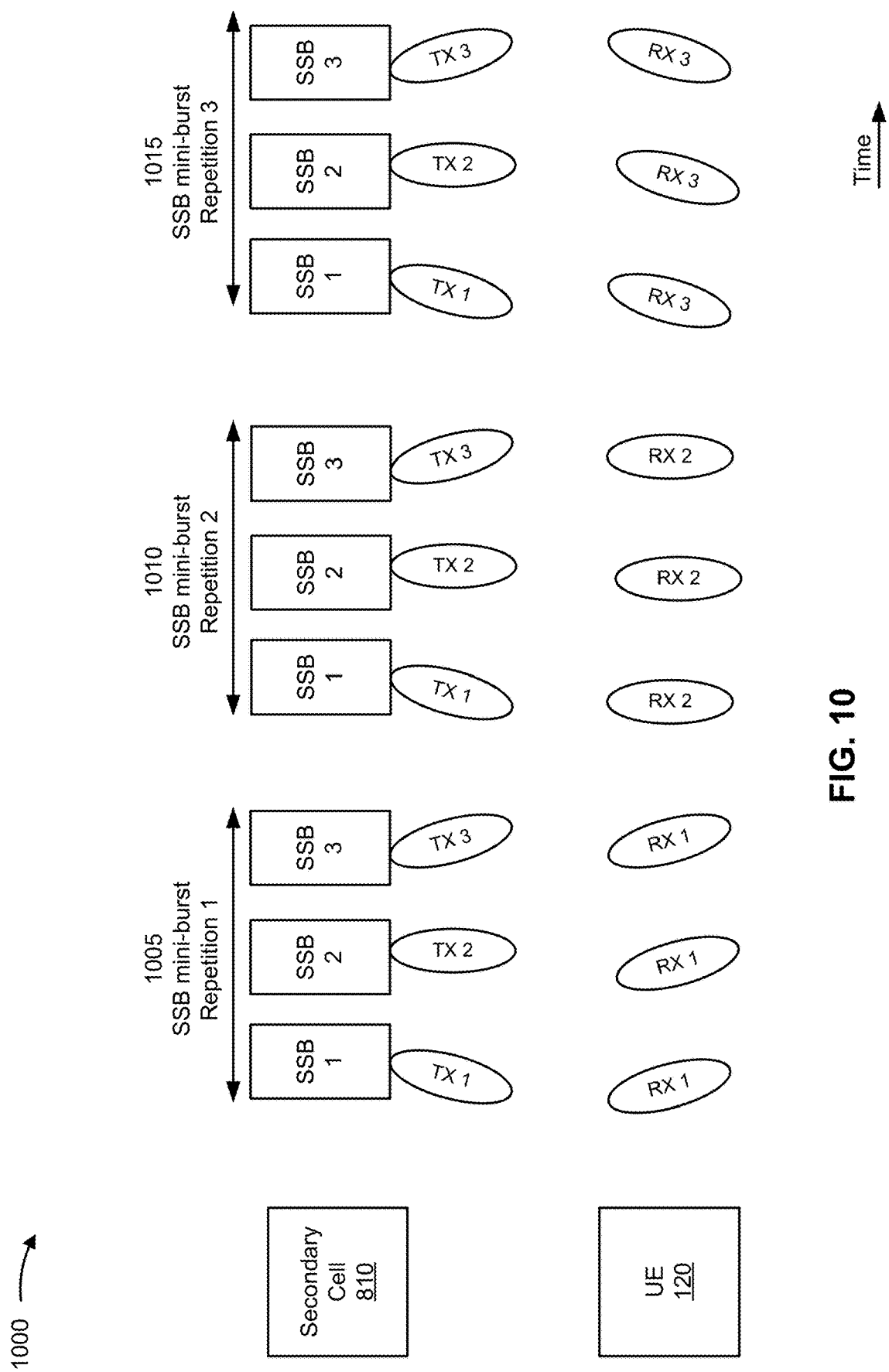
FIG. 10 is a diagram illustrating an example associated with an SS block (SSB) mini-burst, in accordance with the present disclosure.

FIG. 10 is a diagram illustrating an example 1000 associated with an SSB mini-burst, in accordance with the present disclosure. For example, the SSB mini-burst may be used for a beam management procedure between the UE 120 and the secondary cell 810.

As shown in FIG. 10, the secondary cell 810 (e.g. a network node 110 associated with the secondary cell 810) may transmit one or more (e.g., three as shown as an example in FIG. 10) repetitions of an SSB mini-burst. For example, the secondary cell 810 may transmit one or more SSBs corresponding to a quantity of Tx beams that are associated with a beam and/or spatial direction used between the UE 120 and the primary cell 805. As shown in FIG. 10, three Tx beams (e.g., Tx 1, Tx 2, and Tx 3) may be selected for the beam management procedure between the UE 120 and the secondary cell 810. In the first repetition 1005 of the SSB mini-burst, the secondary cell 810 may transmit a first SSB (e.g., SSB 1) using a first Tx beam (e.g., Tx 1), a second SSB (e.g., SSB 2) using a second Tx beam (e.g., Tx 2), and a third SSB (e.g., SSB 3) using a third Tx beam (e.g., Tx 3).

As shown in FIG. 10, the UE 120 may measure the first repetition 1005 using a first Rx beam of the UE 120. For example, as described in more detail elsewhere herein, the UE 120 may select a subset of Rx beams (from a set of Rx beams associated with the secondary cell 810) based at least in part on a beam and/or spatial direction used between the UE 120 and the primary cell 805. As an example, FIG. 10 shows the subset of Rx beams as Rx 1, Rx 2, and Rx 3. The UE 120 may measure the SSBs transmitted in the first repetition 1005 of the SSB mini-burst using the Rx 1 beam.

The secondary cell 810 may transmit a second repetition 1010 of the SSB mini-burst. For example, the secondary cell 810 may perform a Tx beam sweep over the first Tx beam, the second Tx beam, and the third Tx beam in the same manner as described above in connection with the first repetition 1005. The UE 120 may measure the SSBs transmitted in the second repetition 1010 of the SSB mini-burst using the Rx 2 beam. The secondary cell 810 may transmit a third repetition 1015 of the SSB mini-burst. For example, the secondary cell 810 may perform a Tx beam sweep over the first Tx beam, the second Tx beam, and the third Tx beam in the same manner as described above in connection with the first repetition 1005 and the second repetition 1010. The UE 120 may measure the SSBs transmitted in the third repetition 1015 of the SSB mini-burst using the Rx 3 beam. In this way, the UE 120 may perform measurements for all combinations of Tx and Rx beams to enable the UE 120 and/or the secondary cell 810 (or the primary cell 805) to identify a best beam pair for communications between the UE 120 and the secondary cell 810.

In this way, a quantity of beams and/or measurement associated with the beam management procedure between the UE 120 and the secondary cell 810 may be reduced. Additionally, the beams associated with the beam management procedure between the UE 120 and the secondary cell 810 may have a higher likelihood of being associated with higher measurements values (e.g., compared to beams not used for the beam management procedure) because the beams are selected based at least in part on a beam and/or spatial direction used between the UE 120 and the primary cell 805. This may conserve network resources and/or improve a power efficiency associated with the beam management procedure between the UE 120 and the secondary cell 810.

As indicated above, FIG. 10 is provided as an example. Other examples may differ from what is described with regard to FIG. 10.

Figure 11:
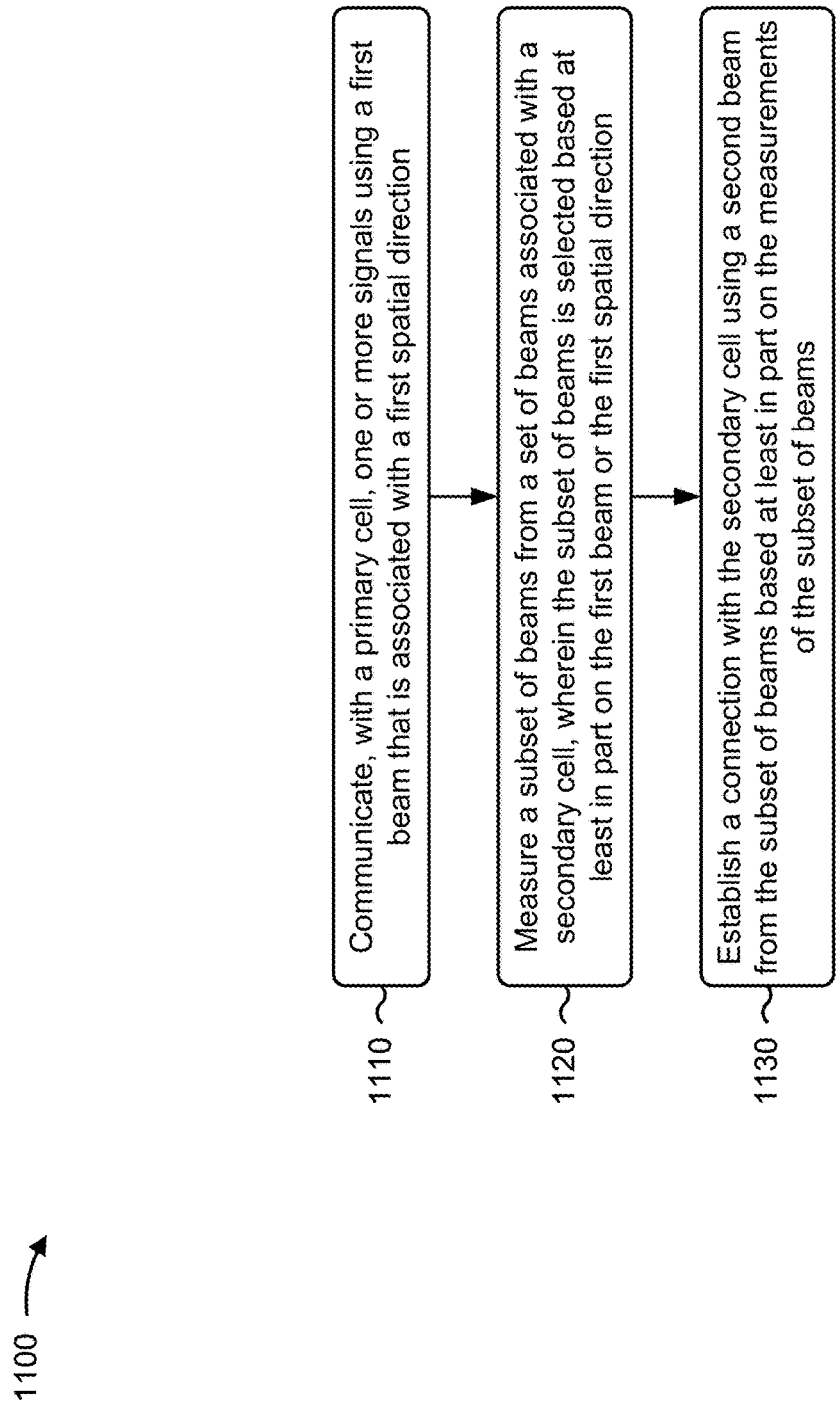
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with primary cell beam-based secondary cell beam indication.

As shown in FIG. 11, in some aspects, process 1100 may include communicating, with a primary cell, one or more signals using a first beam that is associated with a first spatial direction (block 1110). For example, the UE (e.g., using communication manager 140, transmission component 1304, and/or reception component 1302, depicted in FIG. 13) may communicate, with a primary cell, one or more signals using a first beam that is associated with a first spatial direction, as described above, such as in connection with FIGS. 8-10.

As further shown in FIG. 11, in some aspects, process 1100 may include measuring a subset of beams from a set of beams associated with a secondary cell, wherein the subset of beams is selected based at least in part on the first beam or the first spatial direction (block 1120). For example, the UE (e.g., using communication manager 140 and/or measurement component 1308, depicted in FIG. 13) may measure a subset of beams from a set of beams associated with a secondary cell, wherein the subset of beams is selected based at least in part on the first beam or the first spatial direction, as described above, such as in connection with FIGS. 8-10.

As further shown in FIG. 11, in some aspects, process 1100 may include establishing a connection with the secondary cell using a second beam from the subset of beams based at least in part on the measurements of the subset of beams (block 1130). For example, the UE (e.g., using communication manager 140 and/or connection establishment component 1310, depicted in FIG. 13) may establish a connection with the secondary cell using a second beam from the subset of beams based at least in part on the measurements of the subset of beams, as described above, such as in connection with FIGS. 8-10.

Process 1100 may include additional aspects, such as any single aspect or any combination of aspects described below and/or in connection with one or more other processes described elsewhere herein.

In a first aspect, the primary cell is associated with a first operating frequency or a first RAT and the secondary cell is associated with a second operating frequency or a second RAT.

In a second aspect, alone or in combination with the first aspect, the first spatial direction is associated with a first angular spread, and wherein the subset of beams is selected based at least in part on the first angular spread.

In a third aspect, alone or in combination with one or more of the first and second aspects, an association maps beams associated with the primary cell to beams associated with the secondary cell, and wherein the subset of beams is selected based at least in part on the association.

In a fourth aspect, alone or in combination with one or more of the first through third aspects, a first antenna panel associated with the first beam and a second antenna panel associated with the subset of beams at least one of collocated, or associating with a same boresight.

In a fifth aspect, alone or in combination with one or more of the first through fourth aspects, the first spatial direction is indicated based at least in part on information included in a precoding matrix that is associated with the one or more signals.

In a sixth aspect, alone or in combination with one or more of the first through fifth aspects, the first spatial direction is indicated based at least in part on an extracted phase vector associated with the one or more signals.

In a seventh aspect, alone or in combination with one or more of the first through sixth aspects, the first spatial direction is indicated based at least in part on an SVD of a channel associated with the one or more signals.

In an eighth aspect, alone or in combination with one or more of the first through seventh aspects, process 1100 includes performing the SVD of the channel to determine the first spatial direction, and transmitting, to the primary cell, an indication of the first spatial direction.

In a ninth aspect, alone or in combination with one or more of the first through eighth aspects, process 1100 includes receiving, from the primary cell, an indication of the first spatial direction, wherein the first spatial direction is based at least in part on the SVD of the channel.

In a tenth aspect, alone or in combination with one or more of the first through ninth aspects, process 1100 includes transmitting, to the primary cell, an indication of a quantity of repetitions to be associated with a beam management procedure for the secondary cell, wherein the measurements of the subset of beams are associated with the beam management procedure, and wherein the quantity of repetitions is based at least in part on a quantity of beams, included in the subset of beams, that are associated with the first spatial direction.

In an eleventh aspect, alone or in combination with one or more of the first through tenth aspects, process 1100 includes receiving, from the primary cell, an indication of one or more parameters associated with a beam management procedure for the secondary cell, wherein the measurements of the subset of beams are associated with the beam management procedure.

In a twelfth aspect, alone or in combination with one or more of the first through eleventh aspects, the one or more parameters include at least one of a first quantity of signals to be transmitted by the secondary cell associated with the beam management procedure, wherein the first quantity of signals is based at least in part on a quantity of secondary cell transmit beams associated with the first spatial direction, or a second quantity of repetitions to be associated with the signals, wherein the second quantity of repetitions is based at least in part on a quantity of UE receive beams that are associated with the first spatial direction.

In a thirteenth aspect, alone or in combination with one or more of the first through twelfth aspects, process 1100 includes receiving, from the primary cell, an indication of one or more parameters associated with a beam tracking procedure for the secondary cell, wherein the beam tracking procedure is associated with measuring one or more beams included in the subset of beams.

In a fourteenth aspect, alone or in combination with one or more of the first through thirteenth aspects, a serving beam between the UE and the primary cell is switched to the first beam, and wherein measuring the subset of beams is based at least in part on the serving beam being switched.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
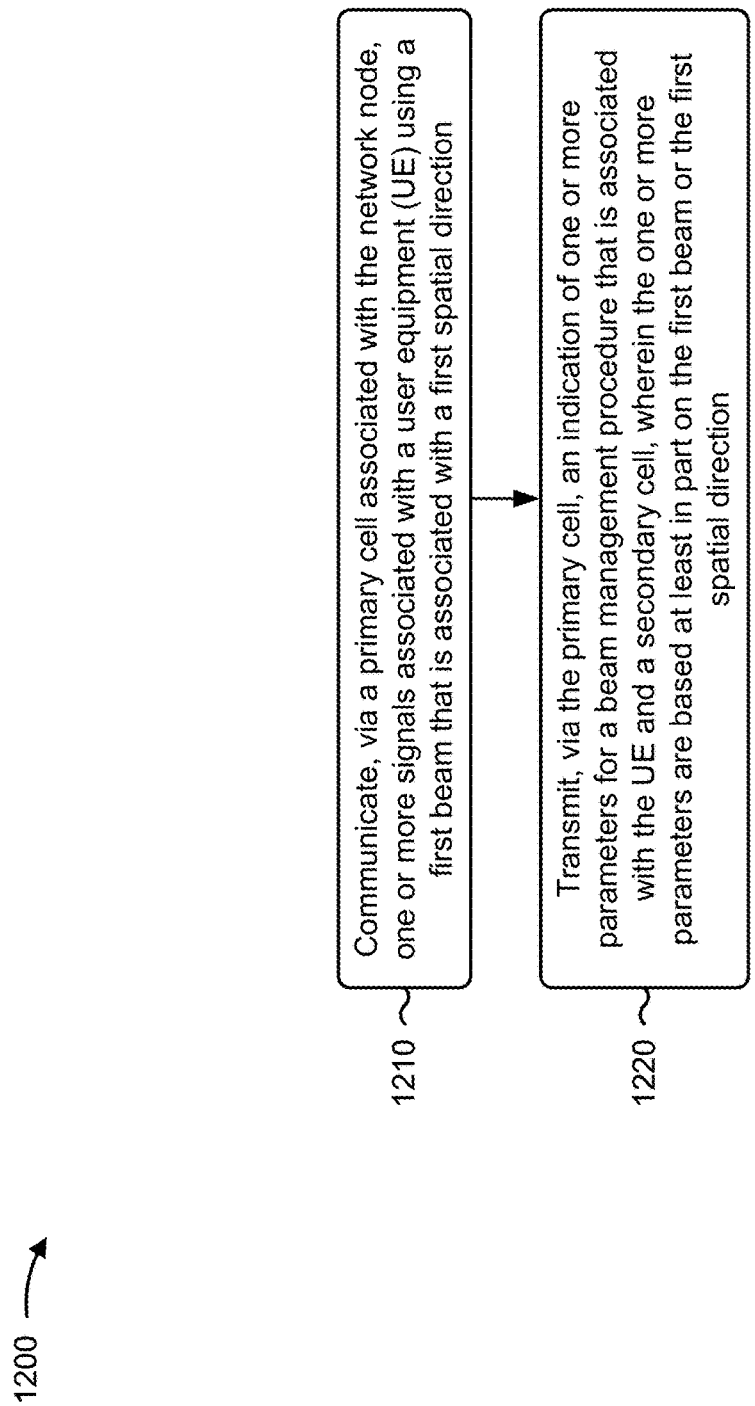
FIG. 12 is a diagram illustrating an example process performed, for example, by a network node, in accordance with the present disclosure.

FIG. 12 is a diagram illustrating an example process 1200 performed, for example, by a network node, in accordance with the present disclosure. Example process 1200 is an example where the network node (e.g., a network node 110 and/or the primary cell 805) performs operations associated with primary cell beam-based secondary cell beam indication.

As shown in FIG. 12, in some aspects, process 1200 may include communicating, via a primary cell associated with the network node, one or more signals associated with a UE using a first beam that is associated with a first spatial direction (block 1210). For example, the network node (e.g., using communication manager 150 and/or transmission component 1404, and/or reception component 1402, depicted in FIG. 14) may communicate, via a primary cell associated with the network node, one or more signals associated with a UE using a first beam that is associated with a first spatial direction, as described above, such as in connection with FIGS. 8-10.

As further shown in FIG. 12, process 1200 may include transmitting, via the primary cell, an indication of one or more parameters for a beam management procedure that is associated with the UE and a secondary cell, wherein the one or more parameters are based at least in part on the first beam or the first spatial direction (block 1220). For example, the network node (e.g., using communication manager 150 and/or transmission component 1404, depicted in FIG. 14) may transmit, via the primary cell, an indication of one or more parameters for a beam management procedure that is associated with the UE and a secondary cell, wherein the one or more parameters are based at least in part on the first beam or the first spatial direction, as described above, such as in connection with FIGS. 8-10.

Process 1200 may include additional aspects, such as any single aspect or any combination of aspects described below and/or in connection with one or more other processes described elsewhere herein.

In a first aspect, the secondary cell is associated with the network node.

In a second aspect, alone or in combination with the first aspect, the primary cell is associated with a first operating frequency or a first RAT and the secondary cell is associated with a second operating frequency or a second RAT.

In a third aspect, alone or in combination with one or more of the first and second aspects, the one or more parameters include a subset of beams from a set of beams associated with the secondary cell, wherein the first spatial direction is associated with a first angular spread, and wherein the subset of beams is selected based at least in part on the first angular spread.

In a fourth aspect, alone or in combination with one or more of the first through third aspects, the one or more parameters include a subset of beams from a set of beams associated with the secondary cell, wherein an association maps beams associated with the primary cell to beams associated with the secondary cell, and wherein the subset of beams is selected based at least in part on the association.

In a fifth aspect, alone or in combination with one or more of the first through fourth aspects, a first antenna panel associated with the first beam and a second antenna panel associated with the secondary cell are at least one of collocated, or associating with a same boresight.

In a sixth aspect, alone or in combination with one or more of the first through fifth aspects, the first spatial direction is indicated based at least in part on information included in a precoding matrix that is associated with the one or more signals.

In a seventh aspect, alone or in combination with one or more of the first through sixth aspects, the first spatial direction is indicated based at least in part on an extracted phase vector associated with the one or more signals.

In an eighth aspect, alone or in combination with one or more of the first through seventh aspects, the first spatial direction is indicated based at least in part on an SVD of a channel associated with the one or more signals.

In a ninth aspect, alone or in combination with one or more of the first through eighth aspects, process 1200 includes performing the SVD of the channel to determine the first spatial direction, and transmitting, via the primary cell, an indication, associated with the UE, of the first spatial direction.

In a tenth aspect, alone or in combination with one or more of the first through ninth aspects, process 1200 includes receiving, via the primary cell and from the UE, an indication of the first spatial direction, wherein the first spatial direction is based at least in part on the SVD of the channel.

In an eleventh aspect, alone or in combination with one or more of the first through tenth aspects, process 1200 includes receiving, via the primary cell and from the UE, an indication of a quantity of repetitions to be associated with the beam management procedure, and wherein the quantity of repetitions is based at least in part on a quantity of beams at the UE that are associated with the first spatial direction.

In a twelfth aspect, alone or in combination with one or more of the first through eleventh aspects, the one or more parameters include at least one of a first quantity of signals to be transmitted by the secondary cell associated with the beam management procedure, wherein the first quantity of signals is based at least in part on a quantity of secondary cell transmit beams associated with the first spatial direction, or a second quantity of repetitions to be associated with the signals, wherein the second quantity of repetitions is based at least in part on a quantity of UE receive beams that are associated with the first spatial direction.

In a thirteenth aspect, alone or in combination with one or more of the first through twelfth aspects, process 1200 includes transmitting, via the primary cell, an indication of one or more parameters, associated with a beam tracking procedure for the secondary cell and the UE, that are based at least in part on the first beam or the first spatial direction.

In a fourteenth aspect, alone or in combination with one or more of the first through thirteenth aspects, a serving beam between the UE and the primary cell is switched to the first beam, and wherein transmitting the indication of the one or more parameters is based at least in part on the serving beam being switched.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
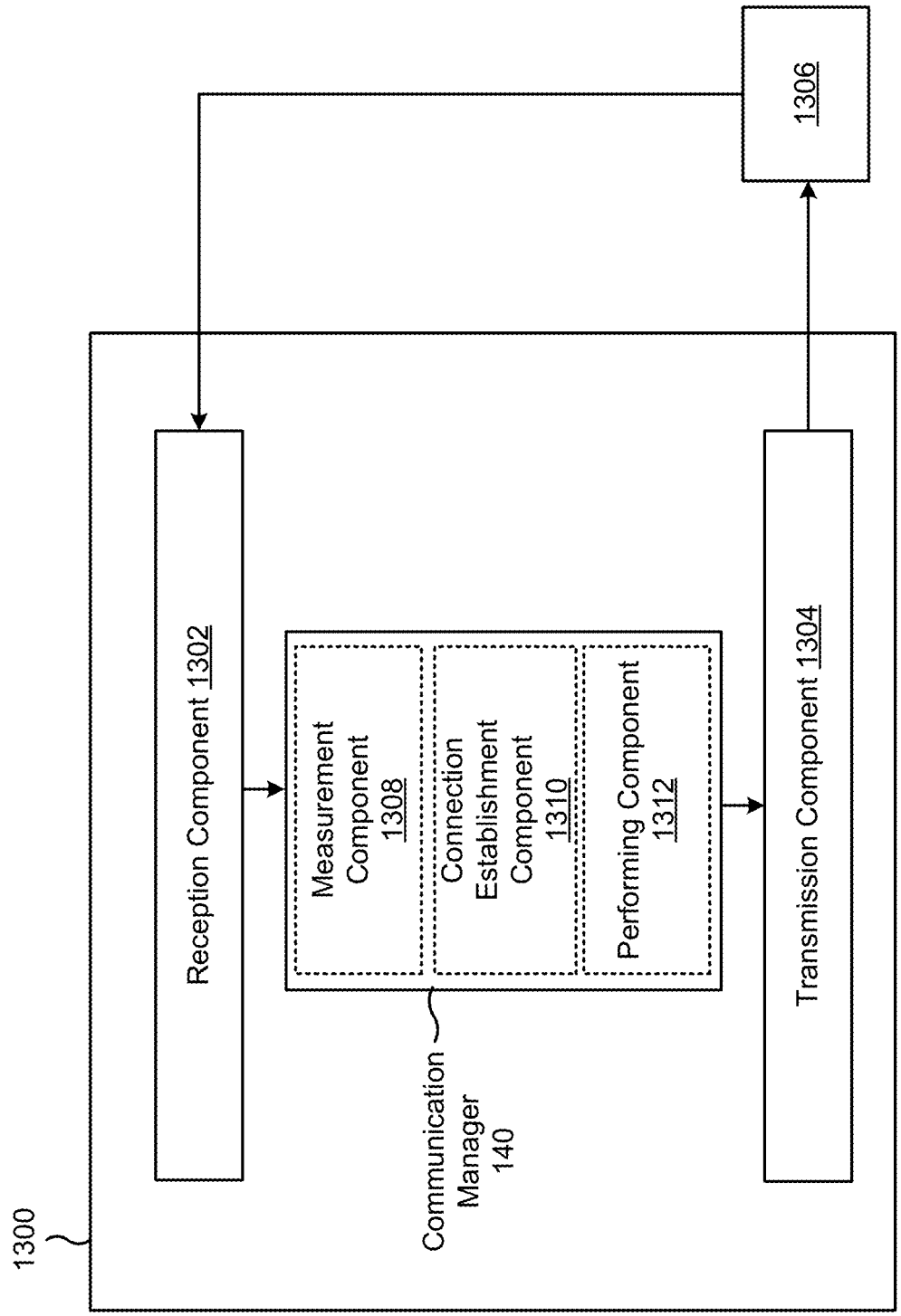
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a measurement component 1308, a connection establishment component 1310, and/or a performing component 1312, among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The transmission component 1304 and/or the reception component 1302 may communicate, with a primary cell, one or more signals using a first beam that is associated with a first spatial direction. The measurement component 1308 may measure a subset of beams from a set of beams associated with a secondary cell, wherein the subset of beams is selected based at least in part on the first beam or the first spatial direction. The connection establishment component 1310 may establish a connection with the secondary cell using a second beam from the subset of beams based at least in part on the measurements of the subset of beams.

The performing component 1312 may perform an SVD of the channel to determine the first spatial direction.

The transmission component 1304 may transmit, to the primary cell, an indication of the first spatial direction.

The reception component 1302 may receive, from the primary cell, an indication of the first spatial direction, wherein the first spatial direction is based at least in part on the SVD of the channel.

The transmission component 1304 may transmit, to the primary cell, an indication of a quantity of repetitions to be associated with a beam management procedure for the secondary cell, wherein the measurements of the subset of beams are associated with the beam management procedure, and wherein the quantity of repetitions is based at least in part on a quantity of beams, included in the subset of beams, that are associated with the first spatial direction.

The reception component 1302 may receive, from the primary cell, an indication of one or more parameters associated with a beam management procedure for the secondary cell, wherein the measurements of the subset of beams are associated with the beam management procedure.

The reception component 1302 may receive, from the primary cell, an indication of one or more parameters associated with a beam tracking procedure for the secondary cell, wherein the beam tracking procedure is associated with measuring one or more beams included in the subset of beams.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
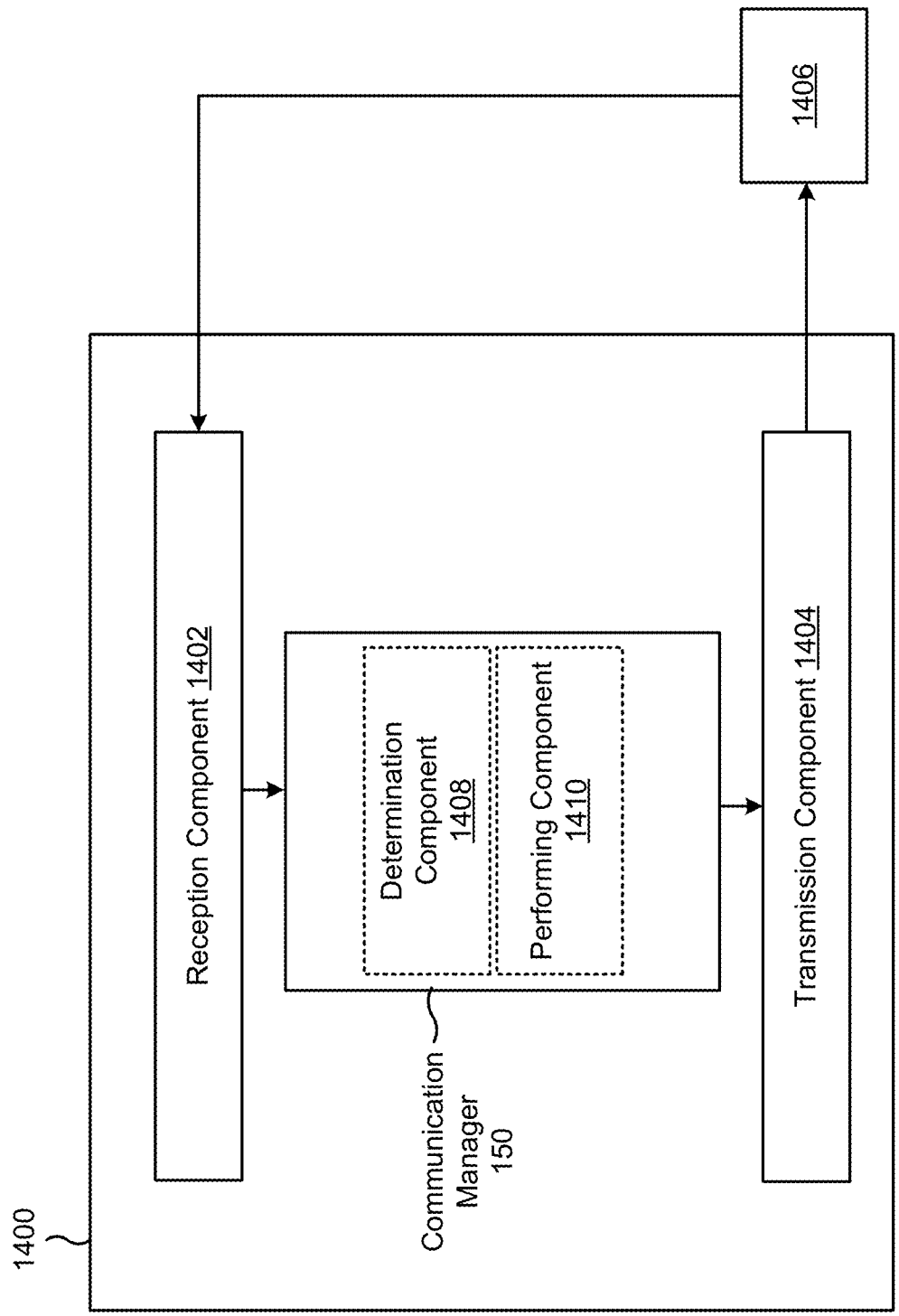
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include one or more of a determination component 1408, and/or a performing component 1410, among other examples.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The reception component 1402 and/or the transmission component 1404 may communicate, via a primary cell associated with the network node, one or more signals associated with a UE using a first beam that is associated with a first spatial direction. The transmission component 1404 may transmit, via the primary cell, an indication of one or more parameters for a beam management procedure that is associated with the UE and a secondary cell, wherein the one or more parameters are based at least in part on the first beam or the first spatial direction.

The determination component 1408 may determine the one or more parameters based at least in part on the first beam or the first spatial direction.

The performing component 1410 may perform an SVD of the channel to determine the first spatial direction.

The transmission component 1404 may transmit, via the primary cell, an indication, associated with the UE, of the first spatial direction.

The reception component 1402 may receive, via the primary cell and from the UE, an indication of the first spatial direction, wherein the first spatial direction is based at least in part on the SVD of the channel.

The reception component 1402 may receive, via the primary cell and from the UE, an indication of a quantity of repetitions to be associated with the beam management procedure, and wherein the quantity of repetitions is based at least in part on a quantity of beams at the UE that are associated with the first spatial direction.

The transmission component 1404 may transmit, via the primary cell, an indication of one or more parameters, associated with a beam tracking procedure for the secondary cell and the UE, that are based at least in part on the first beam or the first spatial direction.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: communicating, with a primary cell, one or more signals using a first beam that is associated with a first spatial direction; measuring a subset of beams from a set of beams associated with a secondary cell, wherein the subset of beams is selected based at least in part on the first beam or the first spatial direction; and establishing a connection with the secondary cell using a second beam from the subset of beams based at least in part on the measurements of the subset of beams.

Aspect 2: The method of Aspect 1, wherein the primary cell is associated with a first operating frequency or a first radio access technology (RAT) and the secondary cell is associated with a second operating frequency or a second RAT.

Aspect 3: The method of any of Aspects 1-2, wherein the first spatial direction is associated with a first angular spread, and wherein the subset of beams is selected based at least in part on the first angular spread.

Aspect 4: The method of any of Aspects 1-3, wherein an association maps beams associated with the primary cell to beams associated with the secondary cell, and wherein the subset of beams is selected based at least in part on the association.

Aspect 5: The method of any of Aspects 1-4, wherein a first antenna panel associated with the first beam and a second antenna panel associated with the subset of beams at least one of: collocated, or associated with a same boresight.

Aspect 6: The method of any of Aspects 1-5, wherein the first spatial direction is indicated based at least in part on information included in a precoding matrix that is associated with the one or more signals.

Aspect 7: The method of any of Aspects 1-6, wherein the first spatial direction is indicated based at least in part on an extracted phase vector associated with the one or more signals.

Aspect 8: The method of any of Aspects 1-7, wherein the first spatial direction is indicated based at least in part on a singular value decomposition (SVD) of a channel associated with the one or more signals.

Aspect 9: The method of Aspect 8, further comprising: performing the SVD of the channel to determine the first spatial direction; and transmitting, to the primary cell, an indication of the first spatial direction.

Aspect 10: The method of Aspect 8, further comprising: receiving, from the primary cell, an indication of the first spatial direction, wherein the first spatial direction is based at least in part on the SVD of the channel.

Aspect 11: The method of any of Aspects 1-10, further comprising: transmitting, to the primary cell, an indication of a quantity of repetitions to be associated with a beam management procedure for the secondary cell, wherein the measurements of the subset of beams are associated with the beam management procedure, and wherein the quantity of repetitions is based at least in part on a quantity of beams, included in the subset of beams, that are associated with the first spatial direction.

Aspect 12: The method of any of Aspects 1-11, further comprising: receiving, from the primary cell, an indication of one or more parameters associated with a beam management procedure for the secondary cell, wherein the measurements of the subset of beams are associated with the beam management procedure.

Aspect 13: The method of Aspect 12, wherein the one or more parameters include at least one of: a first quantity of signals to be transmitted by the secondary cell associated with the beam management procedure, wherein the first quantity of signals is based at least in part on a quantity of secondary cell transmit beams associated with the first spatial direction, or a second quantity of repetitions to be associated with the signals, wherein the second quantity of repetitions is based at least in part on a quantity of UE receive beams that are associated with the first spatial direction.

Aspect 14: The method of any of Aspects 1-13, further comprising: receiving, from the primary cell, an indication of one or more parameters associated with a beam tracking procedure for the secondary cell, wherein the beam tracking procedure is associated with measuring one or more beams included in the subset of beams.

Aspect 15: The method of any of Aspects 1-14, wherein a serving beam between the UE and the primary cell is switched to the first beam, and wherein measuring the subset of beams is based at least in part on the serving beam being switched.

Aspect 16: The method of any of Aspects 1-15, further comprising: transmitting, to the primary cell or the secondary cell, a measurement report indicating the measurements of the subset of beams.

Aspect 17: A method of wireless communication performed by a network node, comprising: communicating, via a primary cell associated with the network node, one or more signals associated with a user equipment (UE) using a first beam that is associated with a first spatial direction; and transmitting, via the primary cell, an indication of one or more parameters for a beam management procedure that is associated with the UE and a secondary cell, wherein the one or more parameters are based at least in part on the first beam or the first spatial direction.

Aspect 18: The method of Aspect 17, wherein the secondary cell is associated with the network node.

Aspect 19: The method of any of Aspects 17-18, wherein the primary cell is associated with a first operating frequency or a first radio access technology (RAT) and the secondary cell is associated with a second operating frequency or a second RAT.

Aspect 20: The method of any of Aspects 17-19, wherein the one or more parameters include a subset of beams from a set of beams associated with the secondary cell, wherein the first spatial direction is associated with a first angular spread, and wherein the subset of beams is selected based at least in part on the first angular spread.

Aspect 21: The method of any of Aspects 17-20, wherein the one or more parameters include a subset of beams from a set of beams associated with the secondary cell, wherein an association maps beams associated with the primary cell to beams associated with the secondary cell, and wherein the subset of beams is selected based at least in part on the association.

Aspect 22: The method of any of Aspects 17-21, wherein a first antenna panel associated with the first beam and a second antenna panel associated with the secondary cell are at least one of: collocated, or associated with a same boresight.

Aspect 23: The method of any of Aspects 17-22, wherein the first spatial direction is indicated based at least in part on information included in a precoding matrix that is associated with the one or more signals.

Aspect 24: The method of any of Aspects 17-23, wherein the first spatial direction is indicated based at least in part on an extracted phase vector associated with the one or more signals.

Aspect 25: The method of any of Aspects 17-24, wherein the first spatial direction is indicated based at least in part on a singular value decomposition (SVD) of a channel associated with the one or more signals.

Aspect 26: The method of Aspect 25, further comprising: performing the SVD of the channel to determine the first spatial direction; and transmitting, via the primary cell, an indication, associated with the UE, of the first spatial direction.

Aspect 27: The method of Aspect 25, further comprising: receiving, via the primary cell and from the UE, an indication of the first spatial direction, wherein the first spatial direction is based at least in part on the SVD of the channel.

Aspect 28: The method of any of Aspects 17-27, further comprising: receiving, via the primary cell and from the UE, an indication of a quantity of repetitions to be associated with the beam management procedure, and wherein the quantity of repetitions is based at least in part on a quantity of beams at the UE that are associated with the first spatial direction.

Aspect 29: The method of any of Aspects 17-28, wherein the one or more parameters include at least one of: a first quantity of signals to be transmitted by the secondary cell associated with the beam management procedure, wherein the first quantity of signals is based at least in part on a quantity of secondary cell transmit beams associated with the first spatial direction, or a second quantity of repetitions to be associated with the signals, wherein the second quantity of repetitions is based at least in part on a quantity of UE receive beams that are associated with the first spatial direction.

Aspect 30: The method of any of Aspects 17-29, further comprising: transmitting, via the primary cell, an indication of one or more parameters, associated with a beam tracking procedure for the secondary cell and the UE, that are based at least in part on the first beam or the first spatial direction.

Aspect 31: The method of any of Aspects 17-30, wherein a serving beam between the UE and the primary cell is switched to the first beam, and wherein transmitting the indication of the one or more parameters is based at least in part on the serving beam being switched.

Aspect 32: The method of any of Aspects 17-31, further comprising: receiving a measurement report indicating the measurements of the subset of beams.

Aspect 33: An apparatus for wireless communication at a device, comprising a processor; memory coupled with the processor; and instructions stored in the memory and executable by the processor to cause the apparatus to perform the method of one or more of Aspects 1-16.

Aspect 34: A device for wireless communication, comprising a memory and one or more processors coupled to the memory, the one or more processors configured to perform the method of one or more of Aspects 1-16.

Aspect 35: An apparatus for wireless communication, comprising at least one means for performing the method of one or more of Aspects 1-16.

Aspect 36: A non-transitory computer-readable medium storing code for wireless communication, the code comprising instructions executable by a processor to perform the method of one or more of Aspects 1-16.

Aspect 37: A non-transitory computer-readable medium storing a set of instructions for wireless communication, the set of instructions comprising one or more instructions that, when executed by one or more processors of a device, cause the device to perform the method of one or more of Aspects 1-16.

Aspect 38: An apparatus for wireless communication at a device, comprising a processor; memory coupled with the processor; and instructions stored in the memory and executable by the processor to cause the apparatus to perform the method of one or more of Aspects 17-32.

Aspect 39: A device for wireless communication, comprising a memory and one or more processors coupled to the memory, the one or more processors configured to perform the method of one or more of Aspects 17-32.

Aspect 40: An apparatus for wireless communication, comprising at least one means for performing the method of one or more of Aspects 17-32.

Aspect 41: A non-transitory computer-readable medium storing code for wireless communication, the code comprising instructions executable by a processor to perform the method of one or more of Aspects 17-32.

Aspect 42: A non-transitory computer-readable medium storing a set of instructions for wireless communication, the set of instructions comprising one or more instructions that, when executed by one or more processors of a device, cause the device to perform the method of one or more of Aspects 17-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      communicate, with a primary cell, one or more signals using a first beam that is associated with a first spatial direction, wherein the primary cell is a low-band cell associated with a first operating frequency range;
      transmit, to the primary cell, an indication of a quantity of repetitions to be associated with a beam measurement procedure for a secondary cell;
      measure a subset of beams from a set of beams associated with the secondary cell, wherein the measurement of the subset of beams are associated with the beam measurement procedure, and wherein the subset of beams is selected based at least in part on the first beam or the first spatial direction, and wherein the secondary cell is a high-band cell associated with a second operating frequency range higher than the first operating frequency range; and
      establish a connection with the secondary cell using a second beam from the subset of beams based at least in part on the measurements of the subset of beams.

2. The UE of claim 1,
wherein the first spatial direction is indicated based at least in part on information included in a precoding matrix that is associated with the one or more signals.

3. The UE of claim 1,
wherein the first spatial direction is indicated based at least in part on an extracted phase vector associated with the one or more signals.

4. The UE of claim 1,
wherein the first spatial direction is indicated based at least in part on a singular value decomposition (SVD) of a channel associated with the one or more signals.

5. The UE of claim 4,
wherein the one or more processors are further configured to:
perform the SVD of the channel to determine the first spatial direction; and
transmit, to the primary cell, an indication of the first spatial direction.

6. The UE of claim 4,
wherein the one or more processors are further configured to:
receive, from the primary cell, an indication of the first spatial direction, wherein the first spatial direction is based at least in part on the SVD of the channel.

7. The UE of claim 1,
wherein the quantity of repetitions is based at least in part on a quantity of beams, included in the subset of beams, that are associated with the first spatial direction.

8. The UE of claim 1,
wherein the one or more processors are further configured to:
receive, from the primary cell, an indication of one or more parameters associated with the beam measurement procedure for the secondary cell, wherein the measurements of the subset of beams are associated with the beam measurement procedure.

9. The UE of claim 8,
wherein the one or more parameters include at least one of:
a first quantity of signals to be transmitted by the secondary cell associated with the beam measurement procedure, wherein the first quantity of signals is based at least in part on a quantity of secondary cell transmit beams associated with the first spatial direction, or
a second quantity of repetitions to be associated with the signals, wherein the second quantity of repetitions is based at least in part on a quantity of UE receive beams that are associated with the first spatial direction.

10. The UE of claim 1,
wherein a serving beam between the UE and the primary cell is switched to the first beam, and
wherein measuring the subset of beams is based at least in part on the serving beam being switched.

11. A network node for wireless communication, comprising:
one or more memories; and
one or more processors, coupled to the one or more memories, configured to:
communicate, via a primary cell associated with the network node, one or more signals associated with a user equipment (UE) using a first beam that is associated with a first spatial direction, wherein the primary cell is a low-band cell associated with a first operating frequency range;
receive, from the UE, an indication of a quantity of repetitions to be associated with a beam measurement procedure that is associated with the UE and a secondary cell; and
transmit, via the primary cell, an indication of one or more parameters for the beam measurement procedure, wherein the one or more parameters are based at least in part on the first beam or the first spatial direction, and wherein the secondary cell is a high-band cell associated with a second operating frequency range higher than the first operating frequency range.

12. The network node of claim 11,
wherein the one or more parameters include a subset of beams from a set of beams associated with the secondary cell, wherein the first spatial direction is associated with a first angular spread, and wherein the subset of beams is selected based at least in part on the first angular spread.

13. The network node of claim 11,
wherein the first spatial direction is indicated based at least in part on information included in a precoding matrix that is associated with the one or more signals.

14. The network node of claim 11,
wherein the first spatial direction is indicated based at least in part on an extracted phase vector associated with the one or more signals.

15. The network node of claim 11,
wherein the one or more parameters include at least one of:
a first quantity of signals to be transmitted by the secondary cell associated with the beam measurement procedure, wherein the first quantity of signals is based at least in part on a quantity of secondary cell transmit beams associated with the first spatial direction, or
a second quantity of repetitions to be associated with the signals, wherein the second quantity of repetitions is based at least in part on a quantity of UE receive beams that are associated with the first spatial direction.

16. A method of wireless communication performed by a user equipment (UE), comprising:
communicating, with a primary cell, one or more signals using a first beam that is associated with a first spatial direction, wherein the primary cell is a low-band cell associated with a first operating frequency range;
transmitting, to the primary cell, an indication of a quantity of repetitions to be associated with a beam measurement procedure for a secondary cell;
measuring a subset of beams from a set of beams associated with the secondary cell, wherein measuring the subset of beams is associated with the beam measurement procedure, and wherein the subset of beams is selected based at least in part on the first beam or the first spatial direction, and wherein the secondary cell is a high-band cell associated with a second operating frequency range higher than the first operating frequency range; and
establishing a connection with the secondary cell using a second beam from the subset of beams based at least in part on the measurements of the subset of beams.

17. The method of claim 16,
wherein the quantity of repetitions is based at least in part on a quantity of beams, included in the subset of beams, that are associated with the first spatial direction.

18. The method of claim 16, further comprising:
receiving, from the primary cell, an indication of one or more parameters associated with the beam measurement procedure for the secondary cell, wherein the measurements of the subset of beams are associated with the beam measurement procedure.

19. The method of claim 18,
wherein the one or more parameters include at least one of:
- a first quantity of signals to be transmitted by the secondary cell associated with the beam measurement procedure, wherein the first quantity of signals is based at least in part on a quantity of secondary cell transmit beams associated with the first spatial direction, or
- a second quantity of repetitions to be associated with the signals, wherein the second quantity of repetitions is based at least in part on a quantity of UE receive beams that are associated with the first spatial direction.

20. The method of claim 16, further comprising:
transmitting, to the primary cell or the secondary cell, a measurement report indicating the measurements of the subset of beams.

* * * * *